(12) United States Patent
Iida et al.

(10) Patent No.: US 11,173,375 B2
(45) Date of Patent: Nov. 16, 2021

(54) INFORMATION PROCESSING APPARATUS AND INFORMATION PROCESSING METHOD

(71) Applicant: SONY CORPORATION, Tokyo (JP)

(72) Inventors: Fumihiko Iida, Kanagawa (JP); Ryuichi Suzuki, Tokyo (JP); Kentaro Ida, Tokyo (JP); Takuya Ikeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/607,784

(22) PCT Filed: Mar. 26, 2018

(86) PCT No.: PCT/JP2018/012081
§ 371 (c)(1),
(2) Date: Oct. 24, 2019

(87) PCT Pub. No.: WO2018/203453
PCT Pub. Date: Nov. 8, 2018

(65) Prior Publication Data
US 2020/0197783 A1 Jun. 25, 2020

(30) Foreign Application Priority Data
May 1, 2017 (JP) .............................. JP2017-091092

(51) Int. Cl.
*A63B 71/00* (2006.01)
*A63B 71/06* (2006.01)
*A63B 24/00* (2006.01)

(52) U.S. Cl.
CPC ...... *A63B 71/0622* (2013.01); *A63B 24/0087* (2013.01); *A63B 2024/0096* (2013.01);
(Continued)

(58) Field of Classification Search
CPC ............ A63B 71/0622; A63B 21/0087; A63B 2024/0096; A63B 2071/0647; A63B 2071/0658
See application file for complete search history.

(56) References Cited

U.S. PATENT DOCUMENTS

| 2004/0001002 A1* | 1/2004 | Blum ...................... G09F 19/22 340/573.1 |
| 2004/0036771 A1* | 2/2004 | Sayers ..................... H04N 7/18 348/157 |

(Continued)

FOREIGN PATENT DOCUMENTS

| EP | 0669758 A1 | 8/1995 |
| JP | 03-260695 A | 11/1991 |

(Continued)

OTHER PUBLICATIONS

International Search Report and Written Opinion of PCT Application No. PCT/JP2018/012081, dated Jun. 19, 2018, 09 pages of ISRWO.

*Primary Examiner* — Zhihan Zhou
(74) *Attorney, Agent, or Firm* — Chip Law Group

(57) ABSTRACT

To provide a mechanism making it possible to provide a more favorable service to an audience viewing the action of performer. An information processing apparatus including: a control unit that outputs content related to a performer, on the basis of detection information detected regarding an audience or the performer who performs an action to be viewed by the audience, in a display region that satisfies a criterion of visibility for the audience and a criterion of ease-of-viewability of an action of the performer by the audience, and does not satisfy a criterion of visibility for the performer.

14 Claims, 18 Drawing Sheets

(52) U.S. Cl.
CPC ......... *A63B 2071/0647* (2013.01); *A63B 2071/0658* (2013.01)

(56) References Cited

U.S. PATENT DOCUMENTS

| | | | | |
|---|---|---|---|---|
| 2009/0231414 | A1* | 9/2009 | Graham | H04N 5/2224 348/14.08 |
| 2013/0120668 | A1* | 5/2013 | Ueda | H04N 9/3179 348/744 |
| 2013/0241925 | A1* | 9/2013 | Konami | G06F 3/013 345/419 |
| 2017/0006322 | A1* | 1/2017 | Dury | A63F 13/49 |
| 2017/0024609 | A1* | 1/2017 | Nishikawa | G06K 9/3233 |
| 2017/0182414 | A1* | 6/2017 | Oishi | A63F 13/219 |

FOREIGN PATENT DOCUMENTS

| | | |
|---|---|---|
| JP | 07-184115 A | 7/1995 |
| JP | 2002-018154 A | 1/2002 |
| JP | 2005-115270 A | 4/2005 |
| JP | 2015-090524 A | 5/2015 |
| JP | 2016-075498 A | 5/2016 |
| WO | 95/07590 A1 | 3/1995 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/012081 filed on Mar. 26, 2018, which claims priority benefit of Japanese Patent Application No. JP 2017-091092 filed in the Japan Patent Office on May 1, 2017. Each of the above-referenced applications is hereby incorporated herein by reference in its entirety.

TECHNICAL FIELD

The present disclosure relates to an information processing apparatus, an information processing method, and a program.

BACKGROUND ART

Recently, a variety of display devices are being developed, including fixed display devices such as television receivers (hereinafter also simply referred to as TVs) and projectors, and mobile display devices such as smartphones and laptop personal computers (PCs). For example, Patent Document 1 below discloses a tabletop interactive projector that projects a video image onto a table and enables interaction between an image appearing on the table and a user.

CITATION LIST

Patent Document

Patent Document 1: Japanese Patent Application Laid-Open No. 2015-90524

SUMMARY OF THE INVENTION

Problems to be Solved by the Invention

Along with the development of a variety of display devices, the situations where display devices are used are also becoming more diverse. One example of such situations is sports events such as baseball and climbing. In a sports event, competition results and information about a performer (for example, a competitor) are provided to an audience viewing the competitor on the scene through a display device such as an electronic sign. However, compared to progress in the development of display devices, the form of providing information is outdated, and further improvements in service are demanded.

Accordingly, the present disclosure provides a mechanism making it possible to provide a more favorable service to an audience viewing the action of a performer.

Solutions to Problems

According to the present disclosure, there is provided an information processing apparatus including: a control unit that outputs content related to a performer, on the basis of detection information detected regarding an audience or the performer who performs an action to be viewed by the audience, in a display region that satisfies a criterion of visibility for the audience and a criterion of ease-of-viewability of an action of the performer by the audience, and does not satisfy a criterion of visibility for the performer.

Further, according to the present disclosure, there is provided an information processing method including: outputting, by an output device, content related to a performer, on the basis of detection information detected regarding an audience or the performer who performs an action to be viewed by the audience, in a display region that satisfies a criterion of visibility for the audience and a criterion of ease-of-viewability of the action of the performer by the audience, and does not satisfy a criterion of visibility for the performer.

Further, according to the present disclosure, there is provided a program causing a computer to function as: a control unit that outputs content related to a performer, on the basis of detection information detected regarding an audience or the performer who performs an action to be viewed by the audience, in a display region that satisfies a criterion of visibility for the audience and a criterion of ease-of-viewability of the action of the performer by the audience, and does not satisfy a criterion of visibility for the performer.

According to the present disclosure, content related to the performer is output in a display region not satisfying a criterion of visibility for the performer while also satisfying a criterion of visibility for the audience as well as a criterion of ease-of-viewability of the action of the performer by the audience. Because the content is output in a location that is easy to see for the audience viewing the action of the performer, convenience is improved for the audience.

Effects of the Invention

According to the present disclosure as described above, a mechanism making it possible to provide a more favorable service to an audience viewing the action of performer is provided. Note that the effects described above are not necessarily limitative. With or in the place of the above effects, there may be achieved any one of the effects described in this specification or other effects that may be grasped from this specification.

MODE FOR CARRYING OUT THE INVENTION

Figure 1:
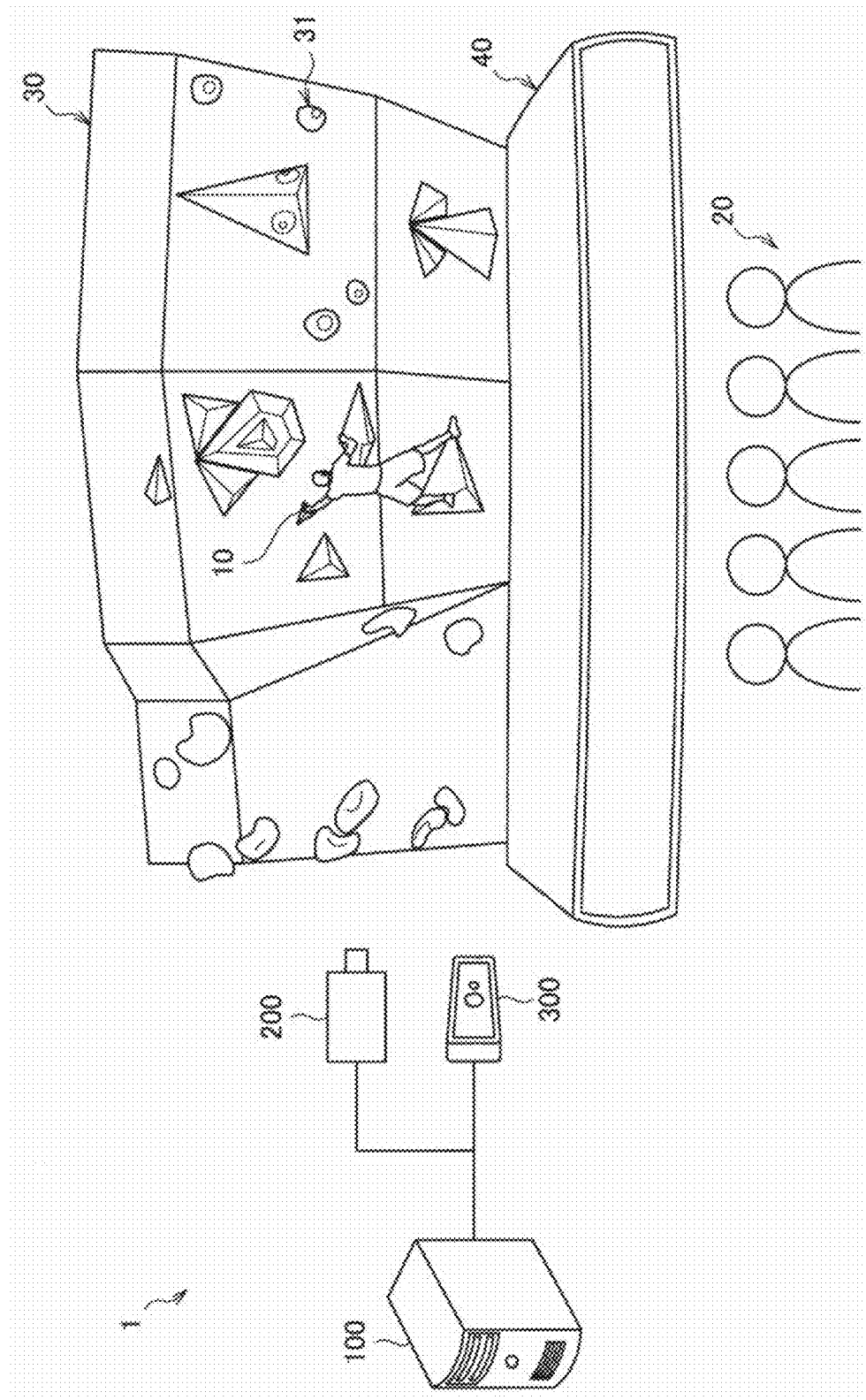
FIG. 1 is a diagram for explaining an overview of a system according to the embodiment.

Hereinafter, (a) preferred embodiment(s) of the present disclosure will be described in detail with reference to the appended drawings. Note that, in this specification and the appended drawings, configuration elements that have substantially the same function and configuration are denoted with the same reference numerals, and repeated explanation of these configuration elements is omitted.

Hereinafter, the description will proceed in the following order.

1. Overview
2. Exemplary configuration
3. Provision processes
3.1. First provision process
3.2. Second provision process
4. Modifications
5. Supplement
6. Example of hardware configuration
7. Conclusion

1. Overview

First, FIG. 1 will be referenced to describe an overview of a system according to one embodiment of the present disclosure.

FIG. 1 is a diagram for explaining an overview of a system 1 according to the embodiment. The system 1 according to the embodiment includes an information processing apparatus 100, an output device 200, and a sensor device 300. The sensor device 300 includes a depth sensor and the like, and the information processing apparatus 100 detects the state of a competitor 10 or the like on the basis of sensing information obtained by the sensor device 300. Also, the output device 200 includes a projector or the like, and the information processing apparatus 100 projects content related to the competitor 10. As illustrated in FIG. 1, the system 1 according to the embodiment may be applied to climbing.

Referring to FIG. 1, an audience 20 views the action of the performer 10. The performer 10 is a competitor in sport climbing who ascends a climbing wall 30, and the action of the competitor 10 is climbing. The climbing wall 30 is provided with holds (protrusions) 31, and the competitor 10 is able to ascend the climbing wall 30 by using the holds 31 as handholds and footholds. In FIG. 1, only one of a plurality of the holds 31 provided on the climbing wall 30 is labeled with a reference sign, while the rest are unlabeled. The same applies to subsequent drawings. The portion of the climbing wall 30 other than the holds 31 is also simply referred to as the "wall". A mat 40 is disposed in front of the climbing wall 30, and ensures the safety of the competitor 10 even if he or she falls. Additionally, the competitor 10 may also wear gear referred to as a harness joined to a rope, also referred to as a lead, that hangs down from above the climbing wall 30. The competition of climbing in this state is also referred to as lead climbing, and even if the competitor 10 falls, the competitor 10 is suspended by the lead and the harness, ensuring his or her safety.

As a first provision process, the system 1 projects content related to the competitor 10 ascending the climbing wall 30 onto the climbing wall 30 in real-time during the activity (for example, during competition). Consequently, the audience 20 is able to easily view the state of competition by the competitor 10 while also grasping the content related to the competitor 10 in real-time.

As a second provision process, the system 1 projects content including replay information recording the state of competition onto the climbing wall 30, for example. With this arrangement, the audience 20 becomes able to enjoy the replay information with a heightened realistic feeling.

In this specification, an example of content at least being output (that is, projected) by a projector is described, but the content may also be output by a monitor formed on the entire face of the climbing wall 30, and may also be presented in an AR display or the like by an HMD or the like. Additionally, the content may also include audio information, haptic information, and the like, and content including such information may also be output.

The system 1 is not limited to being applied to sports climbing. For example, the system 1 is also applicable to baseball, track and field events such as road races, and sports events such as motor races. Also, the system 1 is applicable to public sports such as boat racing. Furthermore, the system 1 is not limited to sports events, and is also applicable to any event where a performer and an audience are present, such as shogi, theater, and live music performances, for example.

2. Exemplary Configuration

Figure 2:
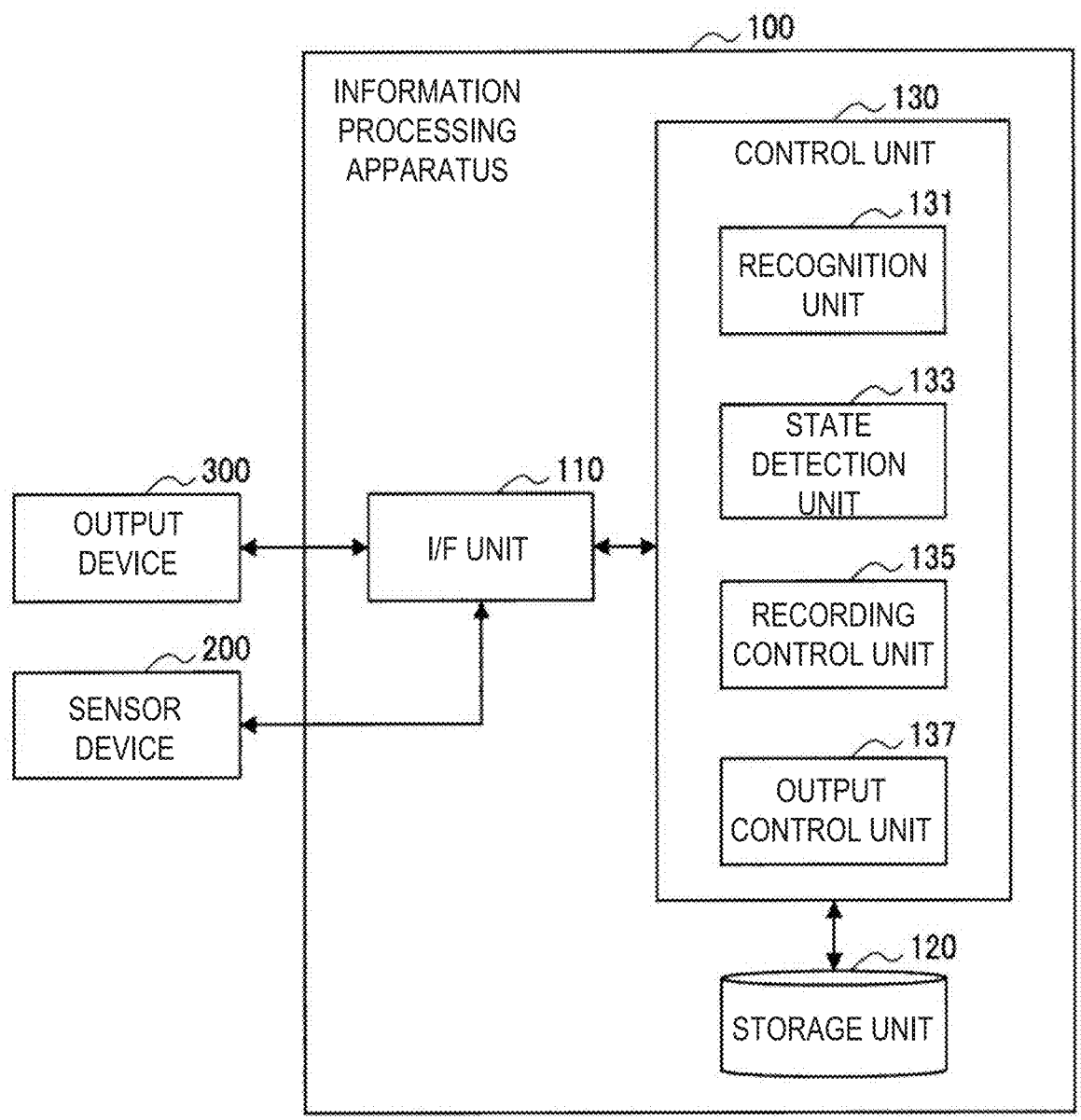
FIG. 2 is a block diagram illustrating one example of a configuration of the system according to the embodiment.

FIG. 2 is a block diagram illustrating one example of a configuration of the system 1 according to the embodiment. As illustrated in FIG. 2, the system 1 includes the information processing apparatus 100, the output device 200, and the sensor device 300.

(1) Output Device 200

The output device 200 includes a variety of output devices. For example, the output device 200 may include a projector, a monitor, a tablet, a smartphone, a PC, a haptic output device, a speaker, and a unidirectional speaker. Note that the system 1 may include one or a combination of a plurality of the above as the output device 200, and may also include a plurality of the same type of device.

The projector is a projection device that projects an image onto any location in a space. The projector may be a stationary wide-angle projector or what is referred to as a moving projector provided with a moving part capable of changing the projection direction, such as a pan/tilt driving projector, for example. The monitor is a device that outputs an input image, and is realized by a liquid crystal display (LCD) or a light-emitting diode (LED) display, for example. The tablet is a mobile device capable of wireless communication typically having a larger screen than a smartphone, and is capable of outputting images, sounds, vibration, and the like. The smartphone is a mobile device capable of wireless communication typically having a smaller screen than a tablet, and is capable of outputting images, sounds, vibration, and the like. The PC may be a stationary desktop PC or a mobile laptop PC, and is capable of outputting images, sounds, and the like. The haptic output device is a device that outputs haptic information such as vibration, a sense of force, or electrical stimulation. The speaker converts audio data into an analog signal through a digital-to-analog converter (DAC) and an amp, and outputs (plays back) sound. The unidirectional speaker is a speaker capable of forming directionality in a single direction.

The output device 200 outputs information on the basis of control by the information processing apparatus 100. The information processing apparatus 100 is also capable of controlling the output method in addition to the content of the information to output. For example, the information processing apparatus 100 can control the projection direction of the projector and control the directionality of the unidirectional speaker.

Note that the output device 200 may also include configuration elements capable of any output other than the configuration elements described above. For example, the output device 200 may also include wearable devices such as a head-mounted display (HMD), augmented reality (AR) glasses, a virtual reality (VR) headset, and a watch-style device.

(2) Sensor Device 300

The sensor device 300 may include a variety of sensors. For example, the sensor device 300 may include a camera, a thermographic camera, a depth sensor, a microphone (hereinafter also referred to as a mic), a pressure sensor, an electrostatic sensor, a strain sensor, an inertial sensor, and a biological sensor. Note that the system 1 may include one or a combination of a plurality of the above as the sensor device 300, and may also include a plurality of the same type of device.

The camera is an imaging device such as an RGB camera that has a lens system, a driving system, and an image sensor, and captures images (still images or moving images). The thermographic camera is an imaging device that captures a captured imaged containing information indicating the temperature of the imaging target with infrared rays or the like. The depth sensor is a device that acquires depth information, such as an infrared ranging device, an ultrasonic ranging device, laser imaging detection and ranging (LiDAR), or a stereo camera. The mic is a device that collects nearby sounds, converts the sounds into a digital signal through an amp and an analog-to-digital converter (ADC), and outputs audio data. The pressure sensor is a device that detects pressure imparted from the outside. The electrostatic sensor is a device that detects changes in electrostatic capacitance, and is a device capable of detecting the proximity of a human body or the like, for example. The strain sensor is a device that detects elongation or compression occurring due to a tensile force or a compressive force being imparted from the outside. The inertial sensor is a device that detects acceleration and angular velocity. The biological sensor is a device that detects biological information such as heart rate and body temperature.

These sensors may be installed in various ways. For example, the camera, the thermographic camera, and the depth sensor may be installed as an environmental sensor group that treats the entire climbing wall as the sensing target. The sensing information obtained by these sensors is used to detect the position, attitude, line of sight, and the like of the competitor 10. Also, for example, the climbing wall 30, the holds 31, the lead, and the mat 40 may be provided with the pressure sensor, the electrostatic sensor, the strain sensor, and the mic. These sensors detect contact between the climbing wall 30, the holds 31, the lead, or the mat 40 and the competitor 10, and force imparted to these from the competitor 10. Also, for example, the inertial sensor and the biological sensor are worn by the competitor 10 oneself and used to improve the accuracy of detecting information related to the competitor 10.

The sensor device 300 may treat not only the competitor 10 but also the audience 20 as a sensing target. For example, the sensor device 300 may include the camera, the thermographic camera, the depth sensor, and the like treating all spectator seats as the sensing target. The pressure sensor and the like may also treat the audience 20 as the sensing target and be provided in the spectator seats, for example. The inertial sensor and the like may also treat the audience 20 as the sensing target and be worn by the audience 20, for example.

The sensor device 300 senses information on the basis of control by the information processing apparatus 100. For example, the information processing apparatus 100 can control the zoom factor and the imaging direction of the camera.

Note that the sensor device 300 may also include configuration elements capable of any sensing other than the configuration elements described above. For example, the sensor device 300 may also include devices that accept the input of information by the competitor 10 or the audience 20, such as a mouse, a keyboard, a touch panel, a button, a switch, or a lever. Also, the sensor device 300 may include any of various types of sensors such as a geomagnetic sensor, a light sensor, and an illuminance sensor.

(3) Information Processing Apparatus 100

The information processing apparatus 100 includes an interface (I/F) unit 110, a storage unit 120, and a control unit 130.

(3.1) I/F Unit 110

The I/F unit 110 is a connecting device for connecting the information processing apparatus 100 to other equipment. The I/F unit 110 is realized by a Universal Serial Bus (USB) connector or the like, for example, and inputs or outputs information with each configuration element of the output device 200 and the sensor device 300.

(3.2) Storage Unit 120

The storage unit 120 temporarily or permanently stores various information for the operation of the information processing apparatus 100. For example, the storage unit 120 stores the replay information described later.

(3.3) Control Unit 130

The control unit 130 controls overall operations inside the information processing apparatus 100 in accordance with various programs. The control unit 130 includes a setting unit 131, a detection unit 133, a recording control unit 135, and an output control unit 137. Hereinafter, the functions of these configuration elements will be described.

Setting Unit 131

The setting unit 131 has a function of setting initial settings.

For example, the setting unit 131 acquires equipment information such as the position and capabilities of each sensor included in the sensor device 300, and sets equipment settings. The equipment information is used when processing sensing information. For example, the detection unit 133 described later may calculate the position of a sensing target by using depth information (that is, the distance) of the sensing target obtained by a plurality of depth sensors in combination with position information about the plurality of depth sensors. Also, the detection unit 133 may perform a detection process that takes into account performance differences between sensors. Otherwise, the setting unit 131 may also set a sensing target and set sensing parameters such as the zoom factor in the sensor device 300.

For example, the setting unit 131 acquires initial information about content and sets content settings. The initial information about content is a content template, for example. The initial information about content is used when generating content. For example, the output control unit 137 described later generates content to output by processing the initial information about content on the basis of the sensing information and/or detection information. Additionally, the setting unit 131 may also set a mode setting, and the generated content may be different depending on the mode. Otherwise, the setting unit 131 may also stop sensing or the like that is unnecessary for generating content, on the basis of the initial information about content.

—Detection Unit 133

The detection unit 133 has a function of detecting detection information about the audience 20 and/or the competitor 10 performing an action viewed by the audience 20, on the basis of the sensing information. Examples of information detected as the detection information are described below.

—Competitor Information

The detection information includes detected competitor information regarding the competitor 10.

The competitor information may include information indicating the position of the competitor 10 inside a space sensed by the sensor device 300. The position of the competitor 10 may be detected by the thermographic camera, the RGB camera, an infrared sensor, an ultrasonic sensor, or the like. To detect the competitor information, a recognition process that for example recognizes the region in which the competitor 10 appears from a captured image, specifies the competitor 10, and the like may also be performed.

The competitor information may include information indicating a line of sight of the competitor 10. The information indicating the line of sight of the competitor 10 includes information indicating a point-of-view position and a line-of-sight direction. The information indicating the line of sight of the competitor 10 may be information indicating the direction of the face and head of the competitor 10, and additionally may be information indicating the direction of the eyeballs. The information indicating the line of sight of the competitor 10 may also include information indicating the distance between the face or eyeballs of the competitor 10 and the climbing wall. The information indicating the line of sight of the competitor 10 may be detected by analyzing an image of the eyes of the competitor 10 obtained by the RGB camera, the infrared camera, an ocular camera worn by the competitor 10, or the like.

The competitor information may include information indicating the attitude of the competitor 10. The information indicating the attitude of the competitor 10 may be detected by analyzing an image obtained by the RGB camera, the infrared camera, or the like, or by analyzing information obtained by the inertial sensor worn by the competitor 10.

The competitor information may include information indicating an action of the competitor 10. The information indicating an action of the competitor 10 includes information indicating the state of contact between the competitor 10 and the holds 31 (such as the presence or absence of contact between the competitor 10 and the holds 31, and the pressure and pressure direction imparted to the holds 31), information indicating the progress of the competition, such as whether the competitor 10 is climbing/has reached a goal/has fallen, and the like. This competitor information is for example detected by the inertial sensor worn by the competitor 10, by the pressure sensor provided in the climbing wall 30, the holds 31, or the mat 40, or the like.

In the case in which a plurality of competitors 10 is present, the competitor information may be detected for each of the competitors 10.

—Audience Information

The detection information includes detected audience information regarding the audience 20. The audience information may be detected with respect to the position, attitude, line of sight, action, and the like of the audience 20 by a process similar to the detection information related to the competitor 10. In the case in which the audience 20 includes a plurality of spectators, the audience information may be detected for each of the spectators in the audience 20.

—Gear Information

The detection information includes detected gear information regarding gear used for the competition by the competitor 10. In the example illustrated in FIG. 1, the climbing wall 30, the holds 31, the mat 40, the harness (not illustrated) being worn by the competitor 10, and the lead joined to the harness correspond to gear used for the competition by the competitor 10. Otherwise, for example, the bat and the ball in baseball or the pieces in shogi correspond to gear used for the competition by the competitor 10.

The gear information may include information indicating the position of the gear inside the space sensed by the sensor device 300. The position of the gear may be detected by the thermographic camera, the RGB camera, an infrared sensor, an ultrasonic sensor, or the like.

The gear information may include information indicating the attitude of the gear. The information indicating the attitude of the gear may be detected by analyzing an image obtained by the RGB camera, the infrared camera, or the like, or by analyzing information obtained by the inertial sensor provided in the gear.

The gear information may include information indicating the state of use of the gear by the competitor 10. The information indicating the state of use of the gear includes information indicating contact between the competitor 10 and the gear, pressure and acceleration imparted to the gear, and the like. In the example illustrated in FIG. 1, the information indicating the state of use of the gear includes information indicating the state of contact between the competitor 10 and the holds 31 (such as the presence or absence of contact between the competitor 10 and the holds 31, and the pressure and pressure direction imparted to the holds 31), and the like. This information indicating the state of use of the gear is for example detected by the inertial sensor worn by the competitor 10, by the pressure sensor provided in the climbing wall 30, the holds 31, or the mat 40, or the like.

In the case in which there is a plurality of pieces of gear, the gear information may be detected for each of the pieces of gear.

—Environment Information

The detection information may include detected environment information regarding the space where the competitor 10 or the audience 20 is present.

The environment information may include information indicating the shape of the space where the competitor 10 or the audience 20 is present. The information indicating the shape of the space includes information indicating the positions and shapes of objects forming the space, such as the climbing wall 30, the holds 31, the mat 40, and the inner walls and spectator seats of the climbing facility in which the climbing wall 30 exists, for example. The information indicating the shape of the space may be two-dimensional information, or may be three-dimensional information such as a point cloud. The information indicating the shape of the space may be detected on the basis of depth information obtained by infrared ranging, ultrasonic ranging, or the stereo camera, for example.

The environment information may include information indicating the state of a projection face (for example, the climbing wall 30) that acts as a candidate projection region. The state of the projection face means the unevenness and color of the projection face, for example. The unevenness of the projection face may be detected on the basis of depth information obtained by LiDAR, for example. The color of the projection face may be detected by analyzing an image obtained by the RGB camera, for example.

The environment information may include information indicating the brightness of the projection face. The brightness of the projection face may be detected by the illuminance sensor or the RGB camera.

—Recording Control Unit 135

The recording control unit 135 has a function of recording replay information related to the competition by the competitor 10.

The replay information may include a video image of the competitor 10 (hereinafter also referred to as a replay video image). For example, the replay video image is a video image of the competitor 10 in mid-competition, or a video image obtained by applying predetermined image processing to such a video image. A competitor included in the replay video image is also referred to as the competitor in the replay. Otherwise, the replay information may also include sensing information such as sound information sensed during competition, and various detection information. In the replay information, information other than the video image is also referred to as additional information.

The replay information is recorded to the storage unit 120, for example. Otherwise, the replay information may also be recorded to a server device on a network or the like.

—Output Control Unit 137

The output control unit 137 has a function of controlling the output of content by the output device 200. First, the output control unit 137 generates content. Subsequently, the output control unit 137 causes the projector to project the content onto the space where the audience 20 and the competitor 10 are present. The output control unit 137 may also cause other output to be output in conjunction with the projection, such as sound output by the speaker and the output of haptic information by the haptic output device.

The content is generated including a variety of information. For example, the output control unit 137 generates content by processing the initial information about content set by the setting unit 131, on the basis of the sensing information and/or the detection information. Also, for example, the output control unit 137 outputs replay information recorded by the recording control unit 135 as content. Hereinafter, one example of the information included in content will be described.

The content may include personal information about the competitor 10. For example, the content includes the name, age, weight, height, nationality, past results (ranking), and the like. This information may be input from a management system of the sports event.

The content may include information related to an ongoing competition by the competitor 10. For example, the content includes the current score, the number of competitions, the elapsed time, and the like. This information may be input from a management system of the sports event.

The content may include biological information about the competitor 10. For example, the content includes the heart rate, the grip strength currently being used, the amount of perspiration, the degree of fatigue, and the like.

The content may include environment information. For example, the content includes the temperature, the humidity, the shape of the climbing wall 30 (particularly the incline and the positions and shapes of the holds 31), and the like.

Otherwise, the content may include a video image of the competitor 10 (for example, a video image shot from a different point of view than the point of view of the audience 20), replay information, history information related to the climbing course (such as the highest point attained, the attainment ratio, and checkpoints), and the like.

The output control unit 137 determines what content to generate according to the type of competition and the characteristics of the event, such as the purpose of the event. For example, the output control unit 137 generates content including the elapsed time in an event where speed is tested, and generates content including the shape of the climbing wall and biological information in a climbing lecture. What kind of content should be generated may also be set initially as the mode setting.

Content is classified into first content and second content according to its properties. The first content is content that does not include information related to an ongoing action (that is, the competition) by the competitor 10. In other words, the first content is content having little or no influence on the competition, even if the content enters the field of view of the competitor 10. For example, the first content includes personal information already understood by the competitor 10, such as one's name and ranking. The second content is content that includes information related to an ongoing action by the competitor 10. In other words, the second content is content having moderate or great influence on the competition if seen by the competitor 10. For example, the second content includes information related to the ongoing competition, such as the current score, the number of competitions, and the elapsed time.

The output control unit 137 controls the position, size, and shape of a content display region (also referred to as the projection region in the case of being projected by the projector), on the basis of the environment information, the sensing information, and the detection information.

For example, the output control unit 137 decides the projection region on the basis of whether or not a criterion of visibility is satisfied for the competitor 10 or the audience 20. The criterion of visibility refers to a criterion (for example, a threshold value) related to at least one piece of information that may affect the visibility of projected content, such as the transparency (that is, the transmittance) of the region, the reflectivity, the brightness, the color, the shape, the breadth, the size of the projected content or the sizes of characters or graphics included in the content, or the positional relationship between the competitor 10 or the audience 20 and the region. The criterion of visibility for the competitor 10 and the criterion of visibility for the audience 20 may be the same or different. A region that satisfies and a region that does not satisfy the criterion of visibility will be described specifically. A region that satisfies the criterion of visibility refers to a region that can guarantee the content being a predetermined brightness or greater in the case of projecting the content, and also is a region that is not transparent or black, for example. On the other hand, a region that does not satisfy visibility refers to a region that cannot guarantee the content being a predetermined brightness or greater in the case of projecting the content, or is a region that is transparent or black, for example. This is because the projected content may become difficult to see in cases where the brightness of the content is too low, the projection face is transparent or black, and the like. Also, a region that satisfies the criterion of visibility refers to a region that could enter the field of view of the competitor 10 or the audience 20 simply by moving one's face or eyeballs without changing one's position, attitude, or attitude, for example. On the other hand, a region that does not satisfy visibility refers to a region that could not enter one's field of view unless the competitor 10 or the audience 20 changes position or moves one's whole body, for example. The visibility of the projected region may fluctuate dynamically depending on the state (such as the position, attitude, and line of sight) of the competitor 10 or the audience 20.

For example, the output control unit 137 decides the projection region on the basis of whether or not a criterion of ease-of-viewability of the competition of the competitor 10 by the audience 20 is satisfied. The criterion of ease-of-viewability refers to a criterion (for example, a threshold value) related to at least one piece of information that is related to the position of the competitor 10 and the projection region and that may affect the visibility of content while viewing the competition, such as the distance between the two, the difference in the distance to the audience 20 of the two, or the angle difference of the two as seen from the audience 20. A region that satisfies and a region that does not satisfy the criterion of ease-of-viewability will be described specifically. A region that satisfies the criterion of ease-of-viewability refers to a region where, in the case of projecting content, the competitor 10 and the content can fit into the field of view of the audience 20 at the same time, or the audience 20 can move one's line of sight back and forth between the content and the competitor 10 by simply moving one's face or eyeballs, without having to move one's body, for example. Also, a region that does not satisfy the criterion of ease-of-viewability refers to a region where, in the case of projecting content, the competitor 10 and the content cannot fit into the field of view of the audience 20 at the same time, or the audience 20 cannot move one's line of sight back and forth between the content and the competitor 10 unless the audience 20 moves one's whole body, for example. The ease-of-viewability of the projected region may fluctuate dynamically depending on the state (such as the position, attitude, and line of sight) of the competitor 10 or the audience 20.

In the case in which the competition is climbing, the projection region is a partial region of the climbing wall 30, and content is projected onto the projection region. To satisfy the criterion of visibility for the audience 20, the output control unit 137 may decide the projection region while avoiding obstructions such as the holds 31, or decide the projection region to be at a position appearing to hang down off the holds 31. Also, in the case in which there is an obstruction in front of the eyes of the audience 20, to satisfy the criterion of visibility for the audience 20, the output control unit 137 may project the content onto the obstruction in front of the eyes of the audience 20. With this arrangement, it becomes possible to guarantee the visibility for the audience 20 according to the position of the audience 20 and the viewing/listening environment.

When projecting content, the output control unit 137 may also control parameters of the content, such as the shape, size, rotation angle (for example, the direction of character strings), the brightness, and the color. For example, the output control unit 137 may project content having a color and a brightness that improves visibility, on the basis of the color and the brightness of the projection region. In addition, the output control unit 137 may also apply a geometric process according to the unevenness of the projection region.

3. Provision Processes

The provision process is classified into a first provision process and a second provision process.

<3.1. First Provision Process>

The first provision process is a process of providing information primarily targeting the audience 20 viewing the state of the competitor 10 in real-time. First, FIG. 3 will be referenced to describe the flow of the first provision process.

Figure 3:
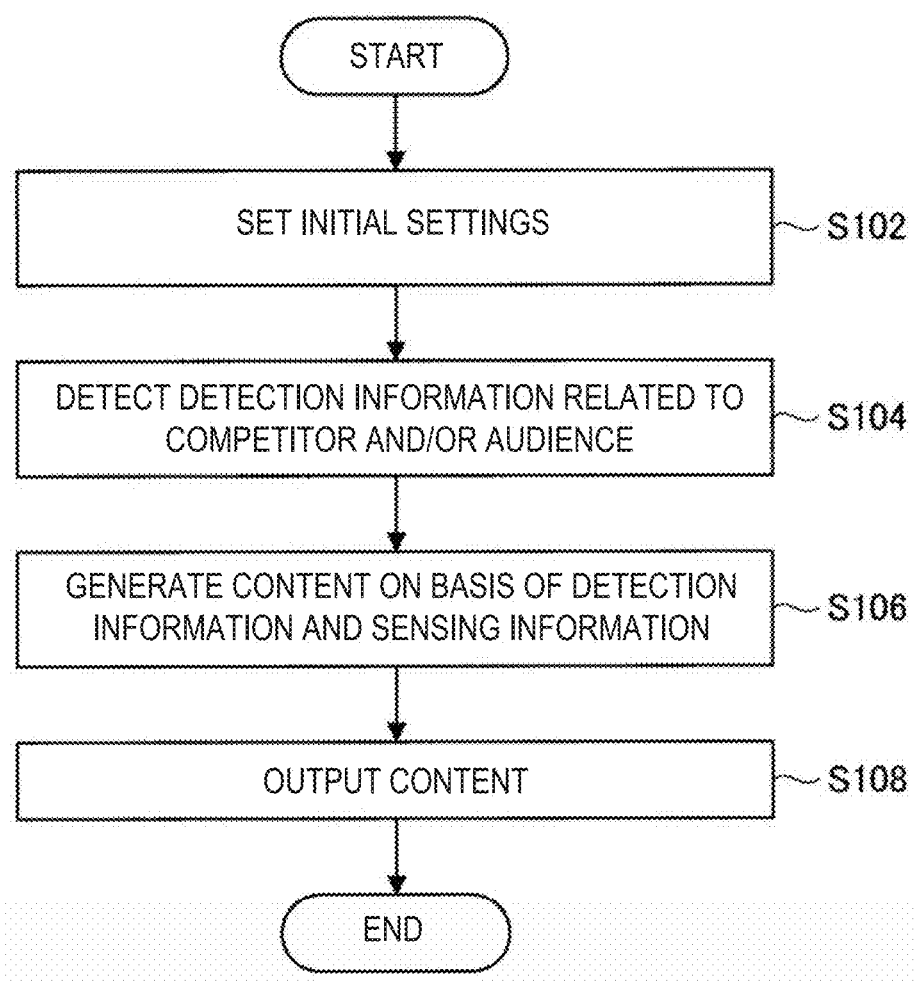
FIG. 3 is a flowchart illustrating one example of the flow of a first provision process executed by an information processing apparatus according to the embodiment.

FIG. 3 is a flowchart illustrating one example of the flow of the first provision process executed by the information processing apparatus 100 according to the embodiment. First, the information processing apparatus 100 sets initial settings such as equipment settings and content settings (step S102). Next, on the basis of the sensing information, the information processing apparatus 100 detects detection information related to the competitor 10 and/or the audience 20, such as the competitor information, the audience information, the gear information, and the environment information (step S104). Next, the information processing apparatus 100 generates content on the basis of the detection information and the sensing information (step S106). Subsequently, the information processing apparatus 100 causes the output device 200 to output the generated content (step S1080).

Next, FIGS. 4 to 9 will be referenced to describe the content provided in the first provision process.

Figure 4:
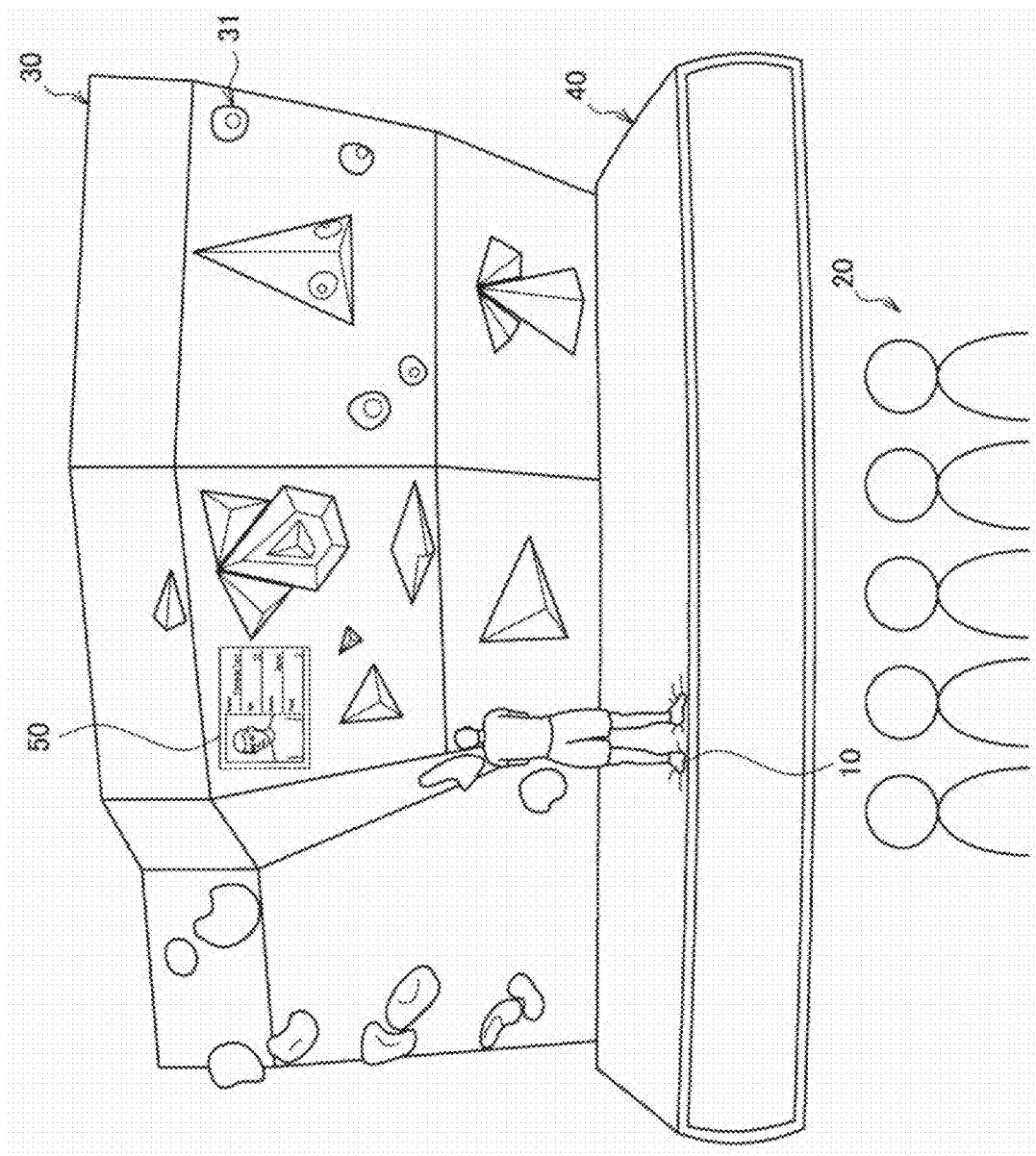
FIG. 4 is a diagram for explaining one example of content provided in the first provision process according to the embodiment.

FIG. 4 is a diagram for explaining one example of the content provided in the first provision process according to the embodiment. FIG. 4 illustrates a situation before competition starts, and content 50 is being projected by treating a portion of the climbing wall 30 as the projection region. The projection region satisfies the criterion of visibility for the competitor 10. For this reason, to eliminate psychological influence on the competitor 10, the system 1 projects the first content as the content 50. It is desirable for the projection region of the content 50 to be a region satisfying the criterion of visibility for the audience 20.

The system 1 may also switch the content output in the projection region between the first content and the second content. Specifically, the system 1 projects content that should be seen by the competitor 10 or the audience 20, and stops the projection of content that should not be seen onto a region where the content could be visible. With this arrangement, the system 1 becomes able to provide content appropriate for the competitor 10 and the audience 20. This point will be described with reference to FIGS. 5 and 6.

Figure 5:
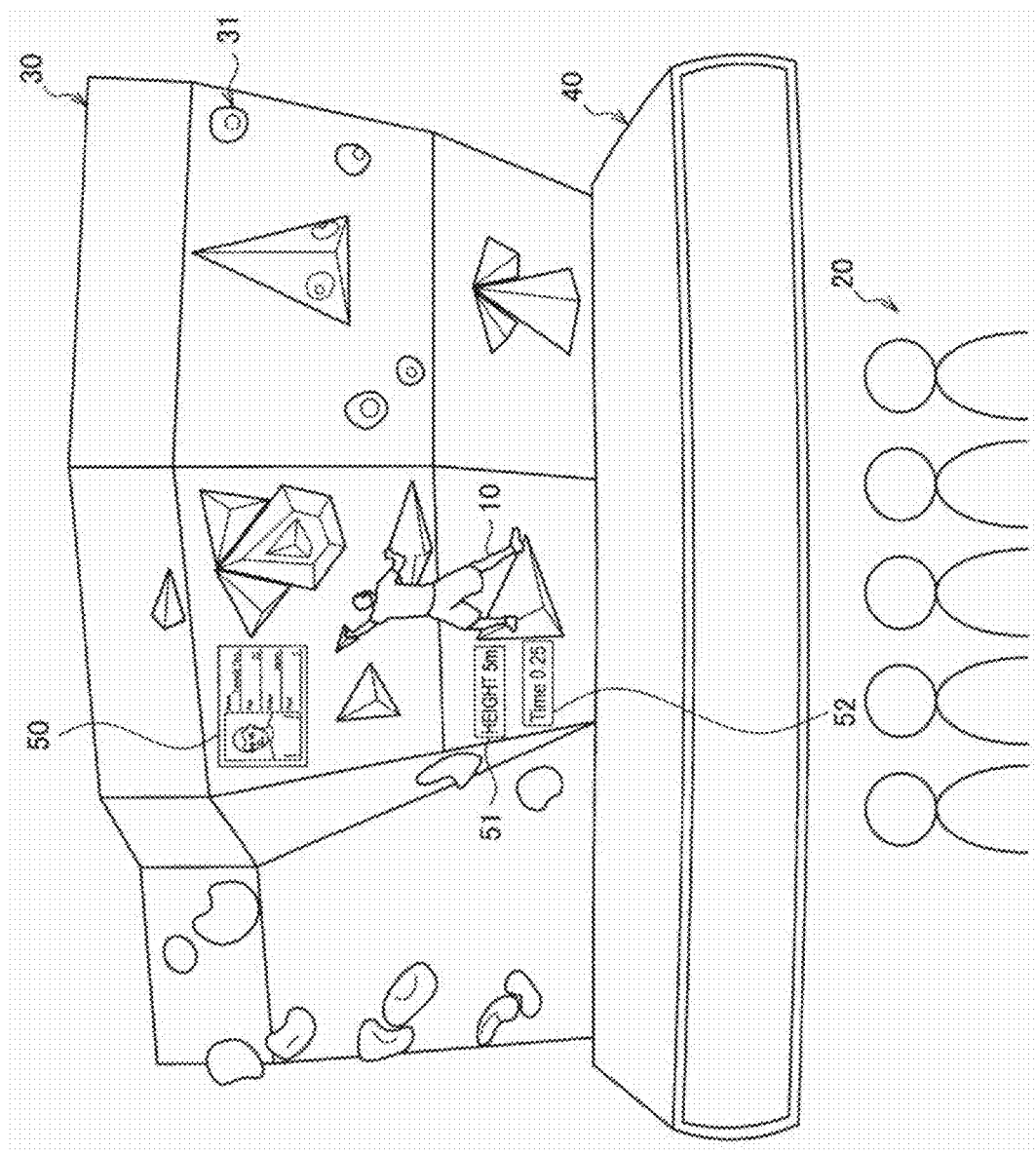
FIG. 5 is a diagram for explaining one example of content provided in the first provision process according to the embodiment.

FIG. 5 is a diagram for explaining one example of the content provided in the first provision process according to the embodiment. FIG. 5 illustrates a situation during competition. In a typical sports event, since information related to a competitor, such as a score or ranking, is provided on an electronic sign or monitor installed in a location distant from the competitor for example, it is difficult for the audience to view the competition while also grasping this information. As a countermeasure, it is conceivable to provide content that includes this information close to the competitor. However, content related to a competition, such as a temporary score during the competition, entering the field of view of the competitors leads to unfair competition, and furthermore, projection light entering the field of view of a competitor also impedes competition. Accordingly, the system 1 projects content onto a projection region that satisfies the criterion of visibility for the audience 20, satisfies the criterion of ease-of-viewability of the competitor 10 by the audience 20, and does not satisfy the criterion of visibility for the competitor 10. For example, the wall at one's feet that does not enter the field of view of the competitor 10, the shadows of the holds 31, a different wall near the wall that the competitor 10 is ascending, a region in a different direction from the line-of-sight direction of the competitor 10, a region distant from the anticipated climbing course, the back of the competitor 10, and the like are conceivable as such projection regions. For example, in the example illustrated in FIG. 5, the content 50 is projected in a different direction from the line-of-sight direction of the competitor 10, while content 51 and 52 is projected in the shadow of a hold 31 as seen from the point of view of the competitor 10. Consequently, the projection regions of these pieces of content are not considered to satisfy the criterion of visibility for the competitor 10. On the other hand, these pieces of content are projected onto the climbing wall 30 in front as seen by the audience 20, and are also projected onto locations near the competitor 10. Consequently, the projection regions of these pieces of content are considered to satisfy the criterion of visibility and the criterion of ease-of-viewability for the audience 20. By deciding such projection regions, it becomes possible to prevent creating unfair competition or impeding the competition, and at the same time satisfy the needs of the audience 20 wanting to view an ongoing competition while also grasping the score and the like in real-time. Note that the content 50 is the first content that continues to be displayed since before the competition. On the other hand, the content 51 and 52 is the second content.

In the case of a plurality of competitors 10 or a plurality of people in the audience 20, the projection region becomes a region that satisfies the criteria of visibility and ease-of-viewability for all or a predetermined portion of the plurality of people in the audience 20, and does not satisfy the criterion of visibility for all or a predetermined portion of the plurality of competitors 10. For example, in the case in which the competition is baseball, the projection region may be the back of the pitcher or the ground behind the pitcher, such that the projection region satisfies the criteria of visibility and ease-of-viewability for the audience 20 in the outfield seats, and does not satisfy the criterion of visibility for the battery and the batter. Also, the projection region may be the back of the catcher or the ground behind the catcher, such that the projection region satisfies the criteria of visibility and ease-of-viewability for the audience 20 behind the backstop, and does not satisfy the criterion of visibility for the battery and the batter.

The system 1 decides the projection region on the basis of the detection information. For example, the system 1 decides the projection region in consideration of the position, attitude, and line of sight of the competitor 10 and/or the audience 20, as well as the incline of the wall, the sizes of the holds 31, and the like. The system 1 may also switch the projection region on the basis of the detection information. For example, in the case in which the projection region changes to one satisfying the criterion of visibility for the competitor 10, the system 1 switches from the projection region so far to a new region that satisfies the criterion of visibility and the criterion of ease-of-viewability for the audience 20 but does not satisfy the criterion of visibility for the competitor 10. By such switching of the projection region, the audience 20 is able to continue being provided with the content. Additionally, for example, the system 1 may also switch the projection region by estimating the future position, attitude, and attitude or the like of the competitor 10 according to the acceleration, movement speed, and the like of the competitor 10.

The system 1 may also decide different projection regions for the first content and the second content. For example, the system 1 may decide the projection region of the second content to be a region of low visibility for the competitor 10, such as a region distant from the competitor 10, compared to the projection region of the first content. In the example illustrated in FIG. 5, whereas the first content 50 may be visible if the competitor 10 moves one's face greatly, the second content 51 and 52 has a low probability of being visible even if the competitor 10 moves one's face greatly. By deciding such projection regions, it becomes possible to further lower the probability of the second content entering the field of view of the competitor 10.

Figure 6:
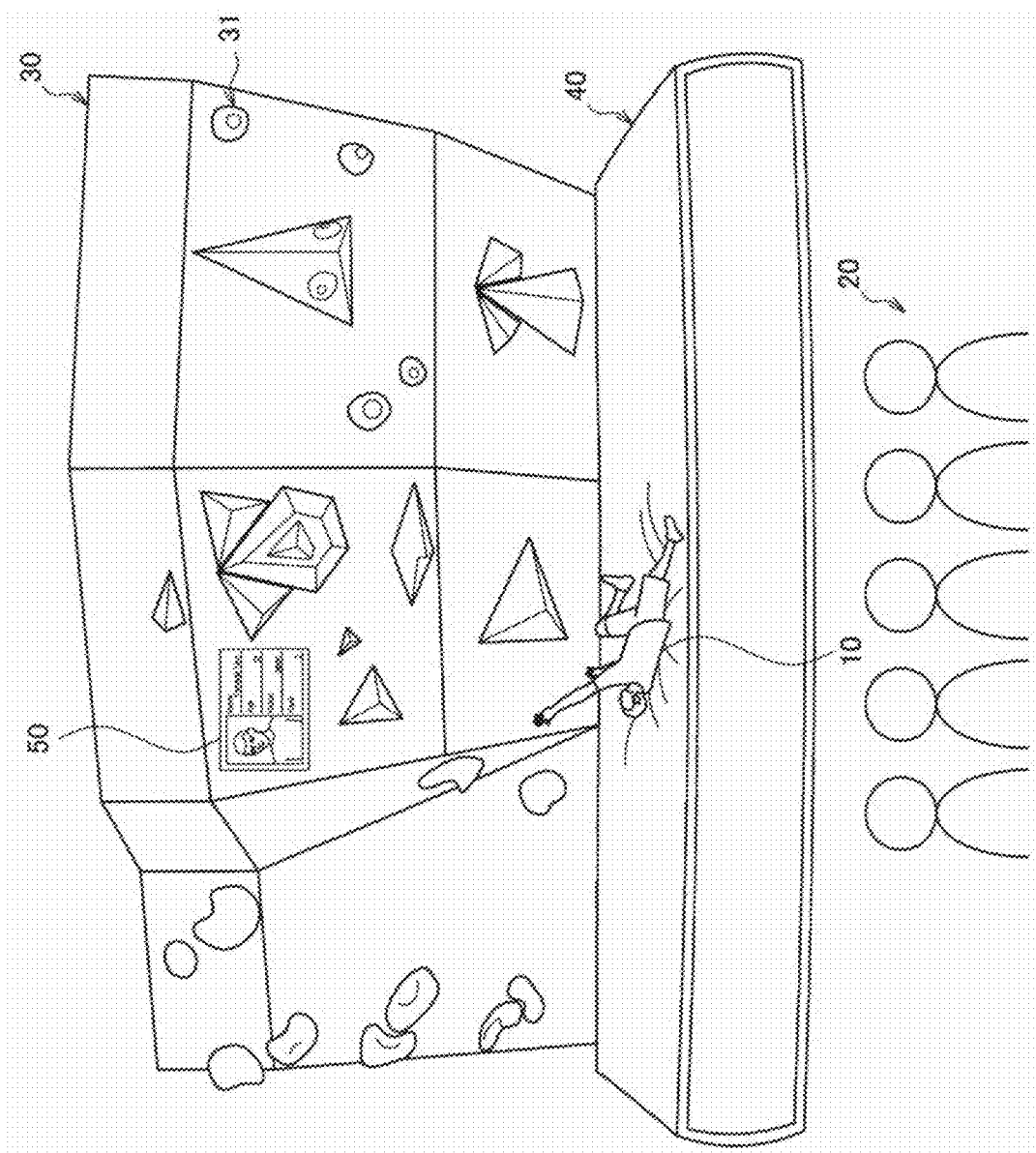
FIG. 6 is a diagram for explaining one example of content provided in the first provision process according to the embodiment.

FIG. 6 is a diagram for explaining one example of the content provided in the first provision process according to the embodiment. FIG. 6 illustrates a situation in which the competitor 10 falls or the like during the competition, and the competition is temporarily interrupted. The position, attitude, and line of sight of the competitor 10 change greatly from those during competition, and a projection region that did not satisfy the criterion of visibility for the competitor 10 during competition may change to one that satisfies the criterion of visibility. Accordingly, if a competition interruption such as a fall is detected according to the detection information, the system 1 stops the projection of the second content. For example, the system 1 hides the second content (for example, by darkening or projecting black), switches the output content to the first content, or hides the second content that had been projected around the competitor 10. Comparing FIGS. 5 and 6, in the case in which the competition is temporarily interrupted, the projection of the first content 50 is continued while the projection of the second content 51 and 52 is stopped. In this way, in the case in which the projection region changes to one that satisfies the criterion of visibility for the competitor 10, the system 1 switches the output content to the first content. With this arrangement, the second content is prevented from entering the field of view of the competitor 10 and leading to unfair competition.

At this point, in the case in which a fall, sudden movement, or the like occurs, cases in which it is difficult to detect the position, attitude, and attitude of the competitor 10 accurately are also conceivable. In such cases, to ensure convenience for the audience 20, it is desirable not to execute a sudden stopping of the projection of the second content. Accordingly, the system 1 may continue to project the second content or cause the second content to fade out gradually.

The content to be projected is not limited to that illustrated in FIGS. 4 to 6. Another example will be described with reference to FIGS. 7 to 9.

Figure 7:
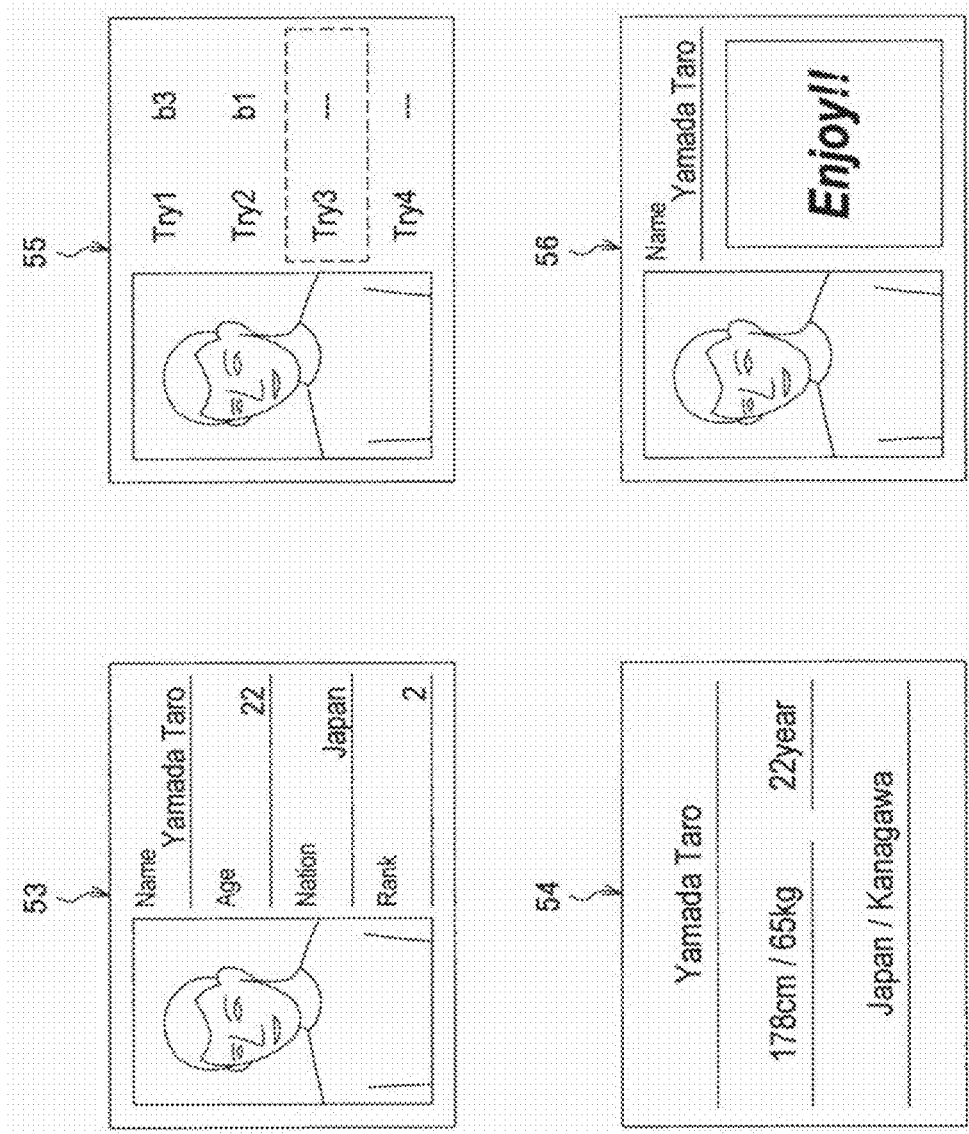
FIG. 7 is a diagram illustrating one example of first content according to the embodiment.

FIG. 7 is a diagram illustrating one example of the first content according to the embodiment. Content 53 to 56 illustrated in FIG. 7 is the first content. The content 53 is personal introduction content that includes an image, name, age, nationality, and ranking of the competitor 10. The content 54 is personal introduction content containing text information only, including the name, height, weight, age, nationality, and hometown of the competitor 10. The content 55 is content that includes the image of the competitor 10 and the competition results so far. The content 56 is content that includes the image and name of the competitor 10, and a supportive comment to the competitor 10.

Figure 8:
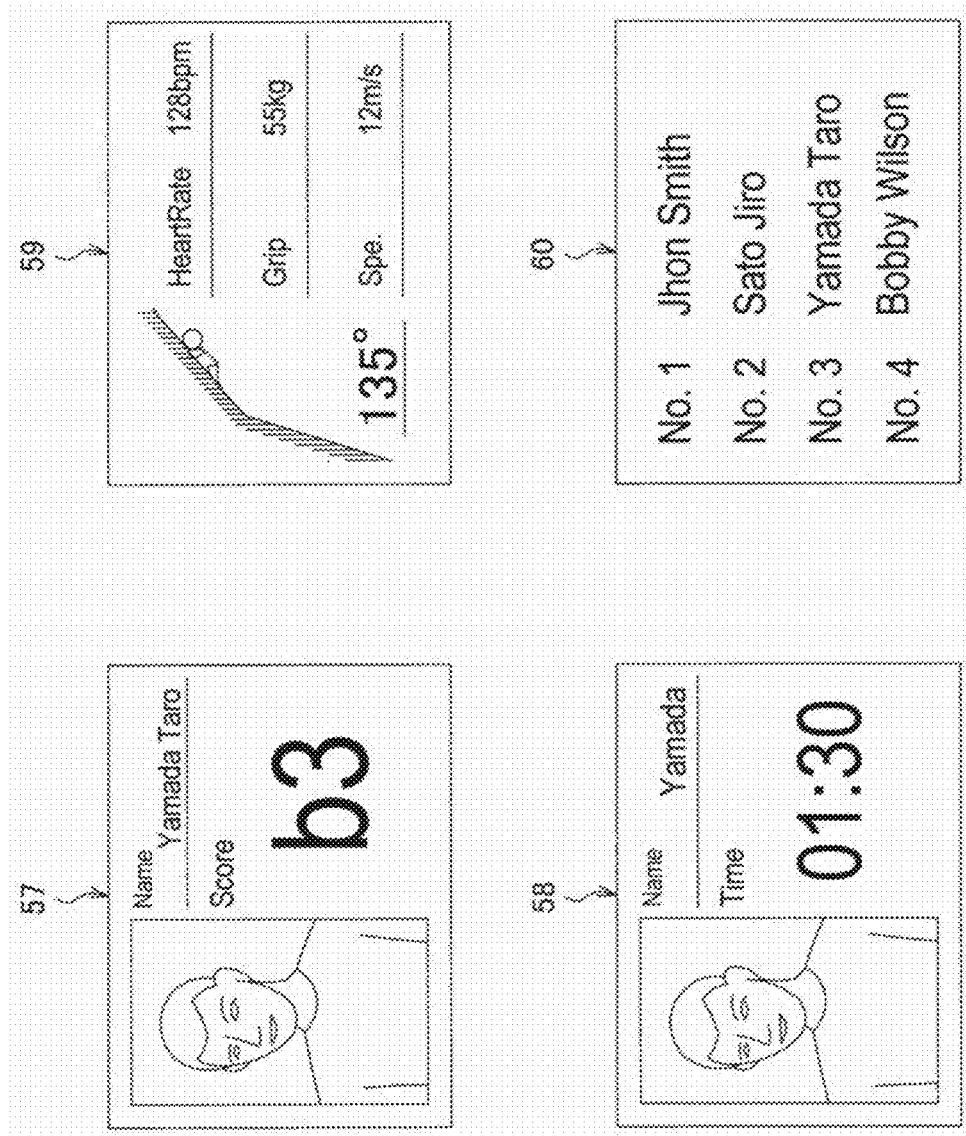
FIG. 8 is a diagram illustrating one example of second content according to the embodiment.

FIG. 8 is a diagram illustrating one example of the second content according to the embodiment. Content 57 to 60 illustrated in FIG. 8 is the second content. The content 57 is content that includes the image and name of the competitor 10, and the score in an ongoing competition. The content 58 is content that includes the image and name of the competitor 10, and the elapsed time in an ongoing competition. The content 59 is content that includes the incline of the climbing wall 30 that the competitor 10 ascends, a heart rate, a grip strength, and a movement speed. The content 60 is content that includes the current rank of the competitor 10.

Figure 9:
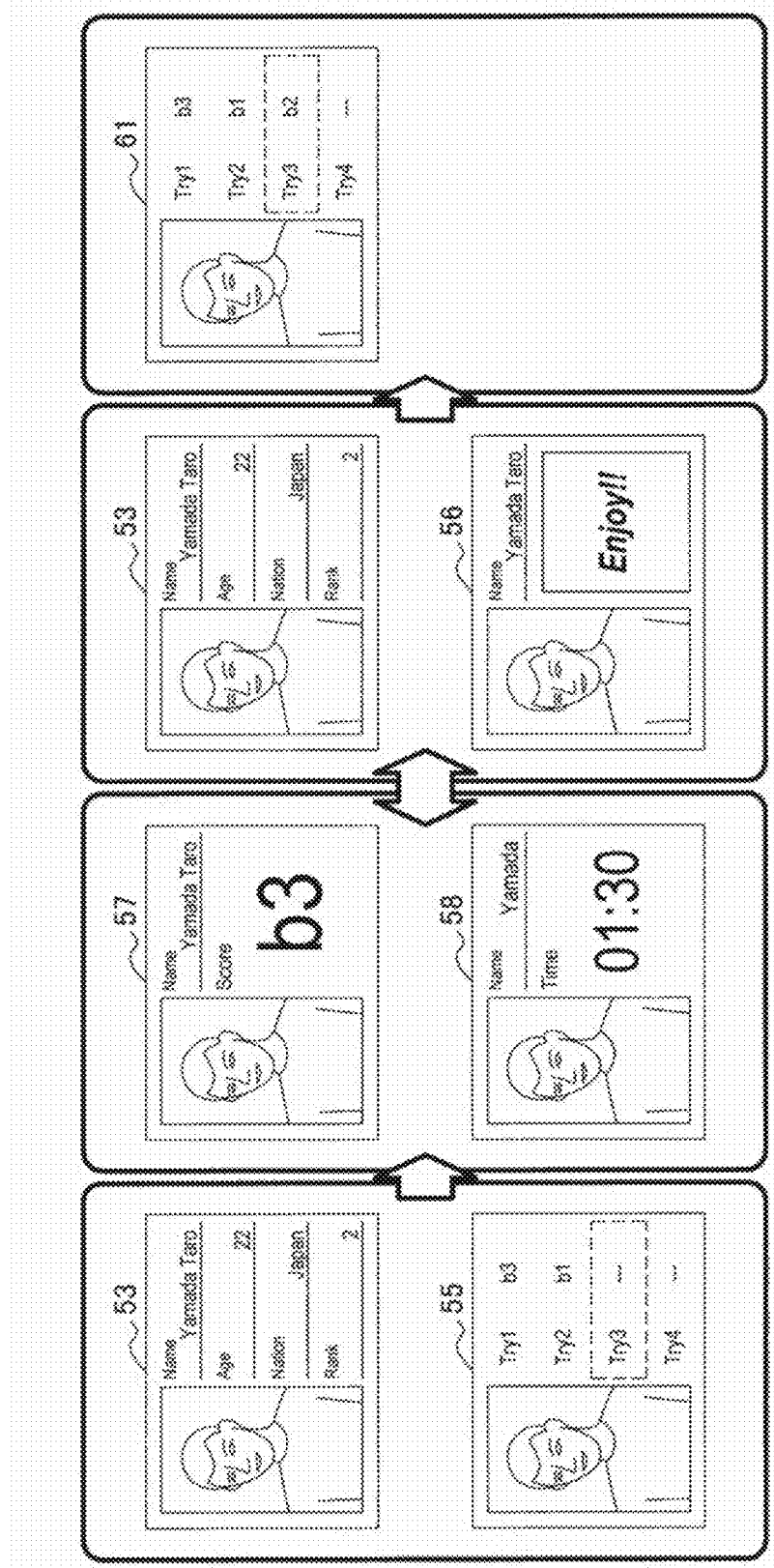
FIG. 9 is a diagram illustrating one example of content transitions according to the embodiment.

FIG. 9 is a diagram illustrating one example of content transitions according to the embodiment. As illustrated in FIG. 9, before the competition, the first content 53 and 55 is projected. Next, during the competition, the second content 57 and 58 is projected, and if a temporary interruption occurs, the second content 57 and 58 is switched to the first content 53 and 56, and when the competition resumes, the second content 57 and 58 is projected again. Additionally, when the competition ends, first content 61 including the result of the competition that has ended is projected.

<3.2. Second Provision Process>

The second provision process is a process of recording and playing back the state of the competitor 10. First, the flow of a recording process will be described with reference to FIG. 10, and the flow of a playback process will be described with reference to FIG. 11.

Figure 10:
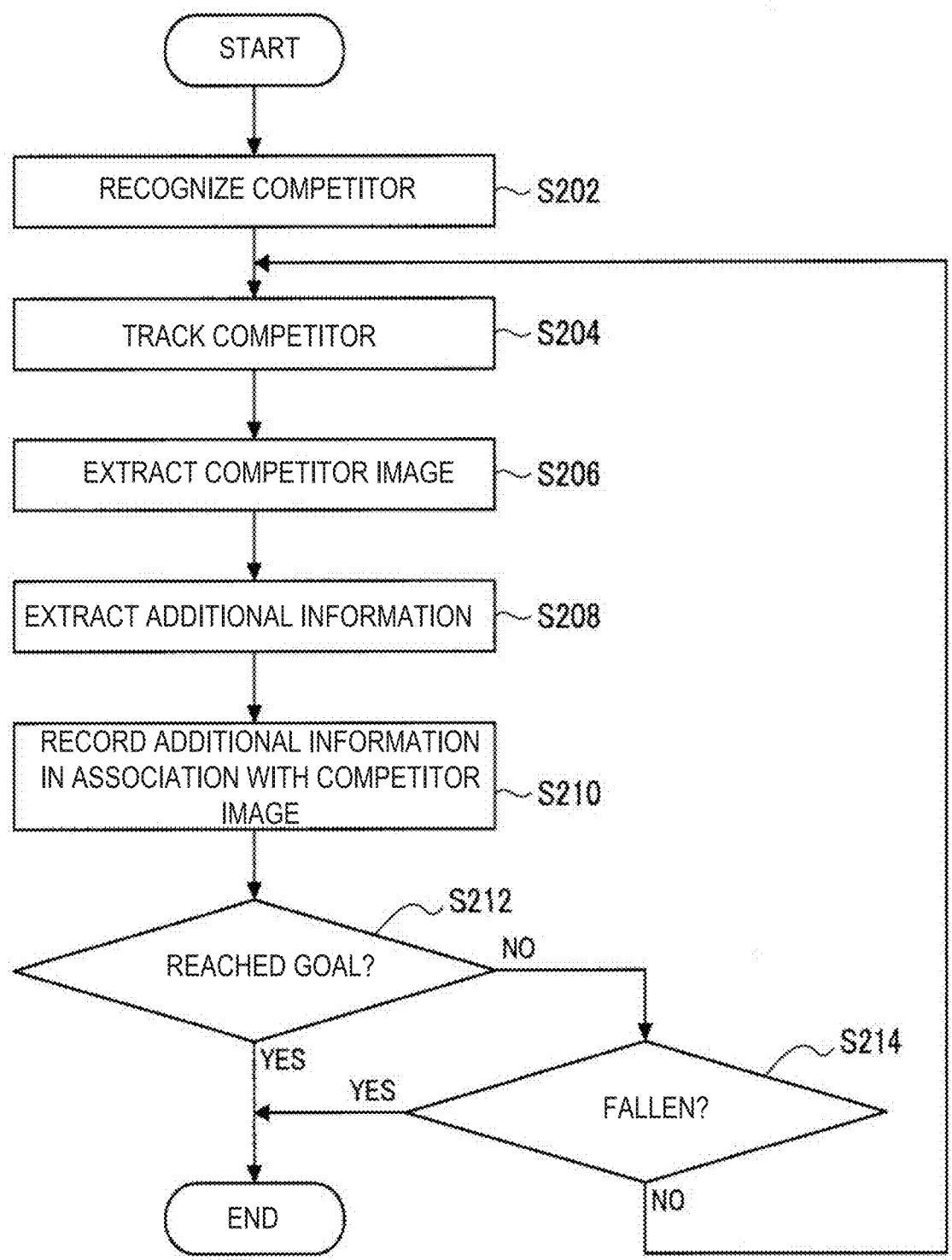
FIG. 10 is a flowchart illustrating one example of the flow of a recording process included in a second provision process executed by the information processing apparatus according to the embodiment.

FIG. 10 is a flowchart illustrating one example of the flow of the recording process included in the second provision process executed by the information processing apparatus 100 according to the embodiment. As illustrated in FIG. 10, first, the information processing apparatus 100 recognizes the competitor 10 on the basis of the sensing information (step S202). The processing thereafter is performed in units of frames (that is, units of images) forming a video image that captures the competitor 10. The information processing apparatus 100 tracks the recognized competitor 10 on the basis of the sensing information (step S204). The tracking is performed by recognizing the region where the competitor 10 appears in a captured image that captures the competitor 10, for example. Next, the information processing apparatus 100 extracts a competitor image in which the region where the competitor 10 appears is extracted from the captured image capturing the competitor 10 (step S206). Next, the information processing apparatus 100 extracts the various detection information described above during the capture of the captured image as additional information (step S208). Next, the information processing apparatus 100 records the additional information in association with the competitor image (step S210). After that, in the case in which the competitor 10 has not reached the goal (step S212/NO) and also has not fallen (step S214/NO), the information processing apparatus 100 repeats the process from step S204. On the other hand, in the case in which the competitor 10 has reached the goal (step S212/YES) or has fallen (step S214/YES), the information processing apparatus 100 ends the recording process. When ending the recording process, replay information associating the additional information for every frame with the replay video image consolidating a series of competitor images in the time direction is recoded.

Figure 11:
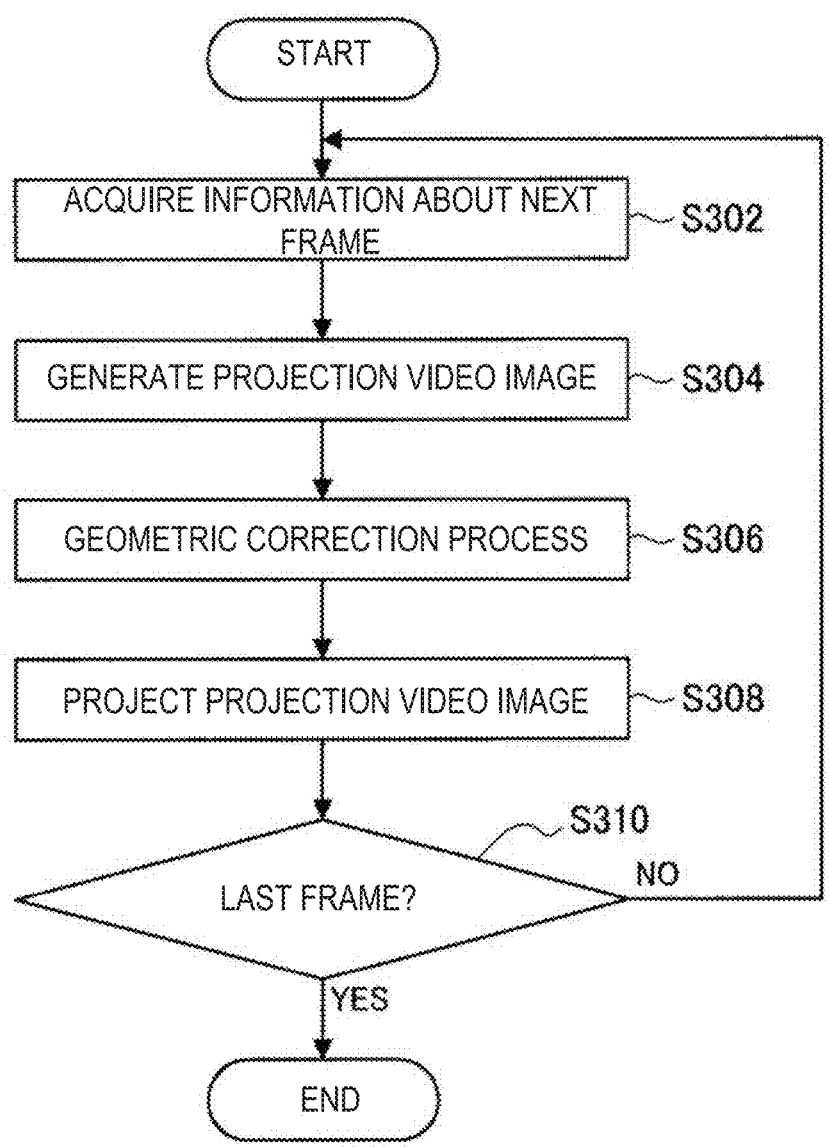
FIG. 11 is a flowchart illustrating one example of the flow of a playback process included in the second provision process executed by the information processing apparatus according to the embodiment.

FIG. 11 is a flowchart illustrating one example of the flow of the playback process included in the second provision process executed by the information processing apparatus 100 according to the embodiment. As illustrated in FIG. 11, first, the information processing apparatus 100 acquires information about the next frame included in the replay information (step S302). Next, the information processing apparatus 100 generates a projection video image on the basis of the acquired replay information (step S304), applies a geometric correction process (step S306), and projects the projection video image (step S308). After that, the information processing apparatus 100 repeats the process from the above step S302 until the replay information reaches the last frame (step S310/NO), and in the case of reaching the last frame (step S310/YES), the information processing apparatus 100 ends the process.

Figure 12:
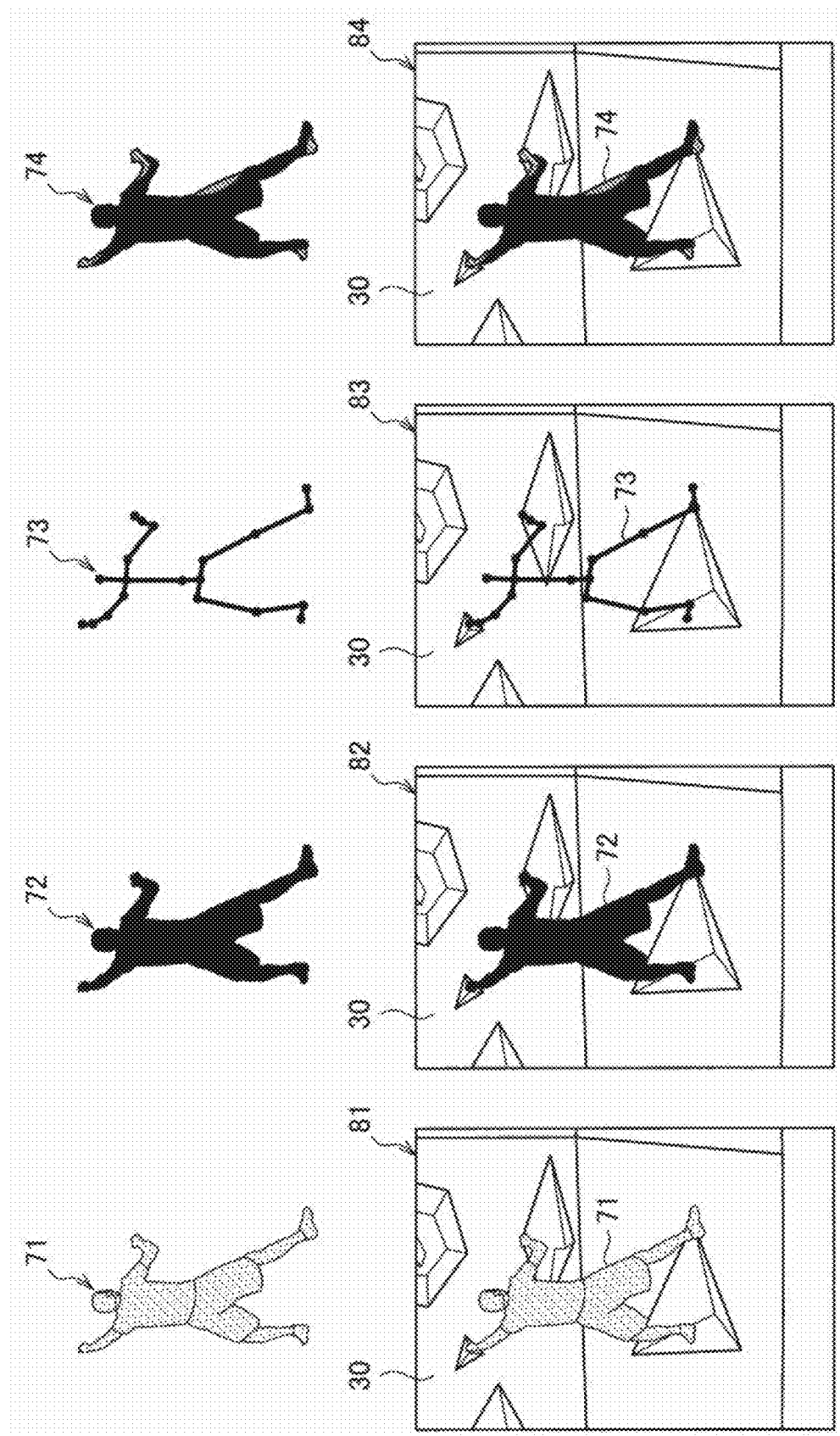
FIG. 12 is a diagram for explaining one example of content provided in the second provision process according to the embodiment.
Figure 13:
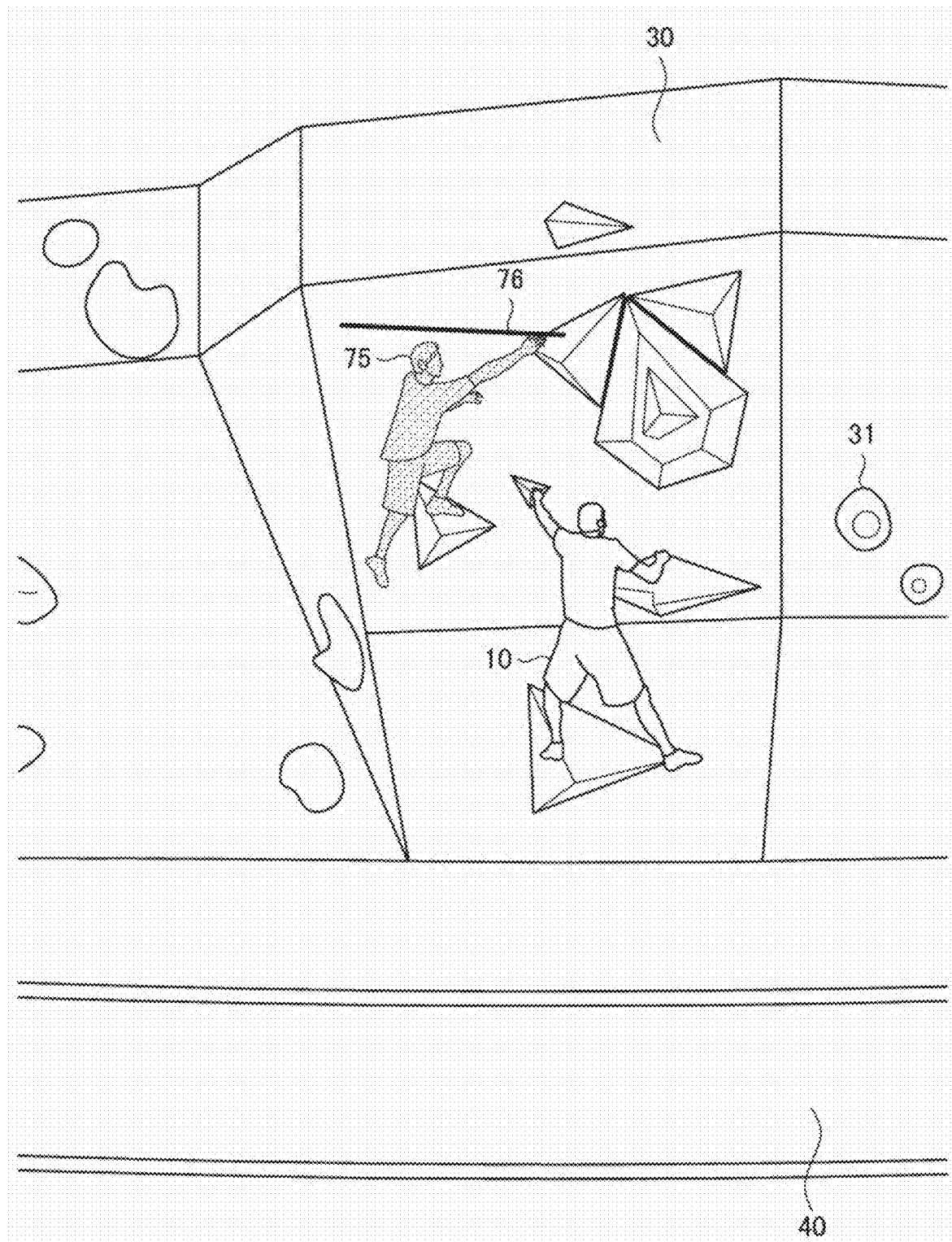
FIG. 13 is a diagram for explaining one example of content provided in the second provision process according to the embodiment.
Figure 14:
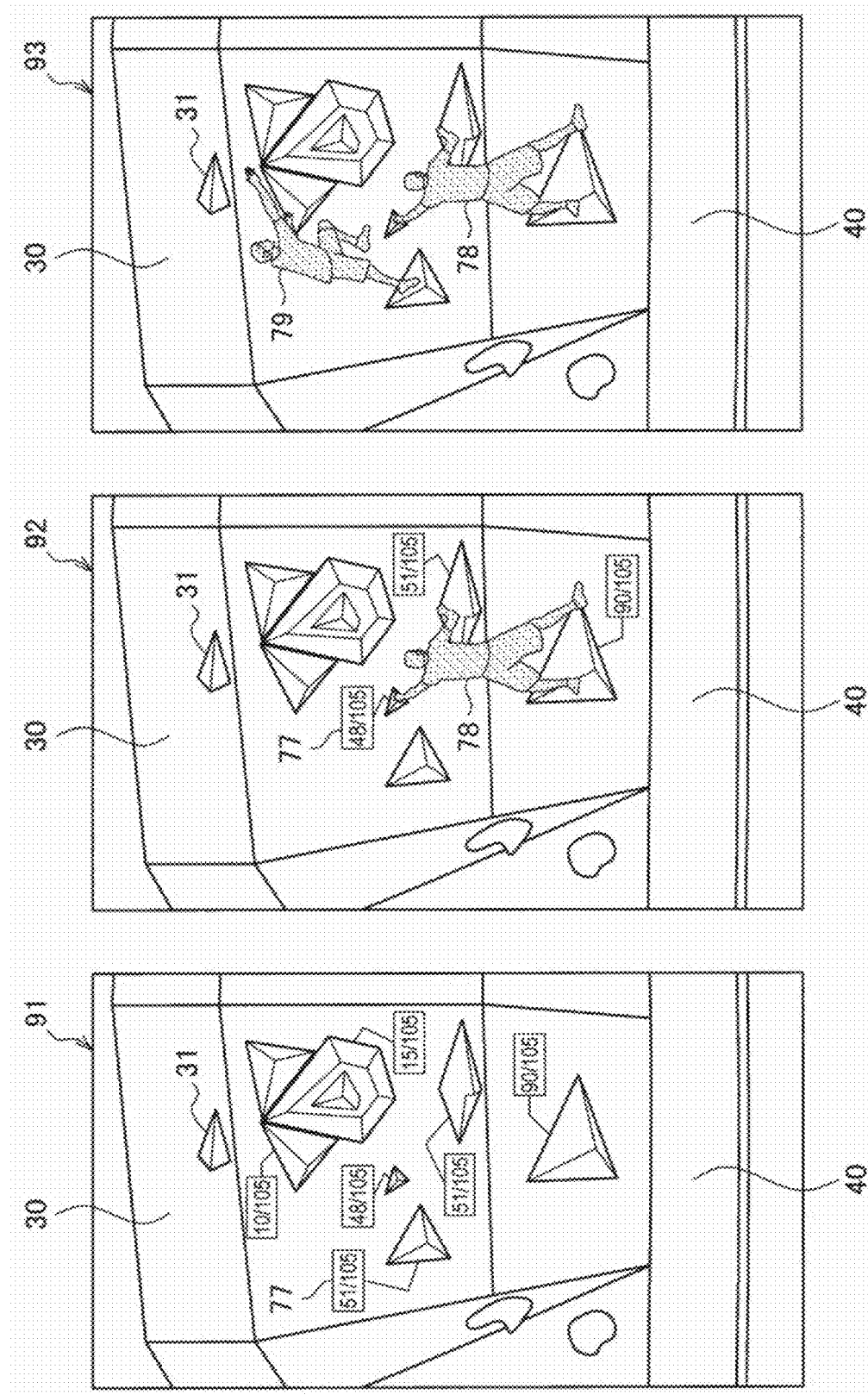
FIG. 14 is a diagram for explaining one example of content provided in the second provision process according to the embodiment.

Next, FIGS. 12 to 14 will be referenced to describe the content provided in the second provision process.

FIG. 12 is a diagram for explaining one example of the content provided in the second provision process according to the embodiment. In FIG. 12, one example of replay information is illustrated. Replay information 71 is a replay video image in which the region where the competitor 10 appears is extracted from a video image of the state of the competitor 10 climbing. Replay information 72 is a replay video image in which the region where the competitor 10 appears has been extracted from the video image of the state of the competitor 10 climbing, and the competitor 10 has been silhouetted by filling such a region with a predetermined color. Replay information 73 is a replay video image in which the motions of the skeleton of the competitor 10 are estimated from the video image of the state of the competitor 10 climbing, and the motions of the skeleton during climbing are reproduced. Replay information 74 is a replay video image in which the region where the competitor 10 appears has been extracted from the video image of the state of the competitor 10 climbing, and the competitor 10 has been silhouetted by filling such a region with a predetermined color, while in addition, information about muscle usage (for example, information indicating the muscles being tensed) has been associated with the silhouette. In the replay video image, besides information about muscle usage, any biological information, such as heartbeat and perspiration, may also be associated with the video image of the competitor 10. Otherwise, besides a video image containing the entirety of the competitor 10, a video image of only an extracted portion of the competitor 10, such as only the hands and feet for example, may also be projected as a replay video image. Also, information indicating the route used by the competitor in the replay may also be projected as replay information. Note that the video image processing such as extracting the region where the competitor 10 appears is described as being performed when recording, but such processing may also be performed during playback.

The system 1 may also output replay information recording a video image of the competitor 10 aligned with the position of the competitor 10 during recording in the same space as the space where competitor 10 competed (in other words, on the same climbing wall 30). For the alignment, the additional information included in the replay information is used. For example, the system 1 aligns the hands and feet of the competitor in the replay with the positions of the holds 31 where pressure was detected during recording. In the signs 81 to 84 of FIG. 12, the replay video images 71 to 74 are output aligned with the position of the competitor during recording on the same climbing wall 30 as the climbing wall 30 where the competitor in the replay competed. With such an aligned playback process, it becomes possible to provide replay information to the audience 20 with a heightened realistic feeling.

A playback process in the same space may be performed to provide replay video images and highlight video images of competitions so far between individual competitions in the sports event, for example. In this case, it becomes possible to stage the sports event effectively. Otherwise, a playback process in the same space may be performed to provide a video image that acts as a model in a climbing lecture. In this case, because a student attending the lecture who is about to attempt to climb the climbing wall is provided with information indicating how to climb with a heightened realistic feeling, it is possible to raise the danger avoidance effectiveness and the educational effectiveness. Note that not only the competitor 10 but also the designer of a climbing course is conceivable as recipients of such a lecture. For example, the designer is able to attach the holds 31 to the climbing wall while referring to the replay information.

The system 1 may also output replay information recording a video image of the competitor 10 in a different space (for example, a climbing facility in a remote location) from the space where the competitor 10 engaged in activity. At this point, in the case in which the climbing wall 30 where the competitor 10 competed and the climbing wall of the projection region have the same or similar shapes, the system 1 may perform alignment similarly to the above. Also, in the case in which the projection region is a flat screen or the like, the system 1 may also project the replay information while also projecting a video image of the climbing wall 30 overall. With such a playback process, even an audience 20 at a remote location becomes able to view the competition by the competitor 10.

The system 1 may also record a video image of a first performer and output a replay video image of the recorded first performer in the space (that is, the climbing wall 30) where a second performer is engaged in activity. This point will be described with reference to FIG. 13.

FIG. 13 is a diagram for explaining one example of the content provided in the second provision process according to the embodiment. In the example illustrated in FIG. 13, when the competitor 10 ascends the climbing wall 30, a replay video image 75 and information 76 indicating the current height of the competitor in the replay are projected. Consequently, the competitor 10 is able to climb using the replay video image 75 as a model, or climb while competing against the replay video image 75. With this arrangement, the climbing experience of the competitor 10 is enriched. Note that the competitor in the replay video image may be the same person as or a different person from the competitor 10 currently competing.

FIG. 14 is a diagram for explaining one example of the content provided in the second provision process according to the embodiment. In the example indicated by the sign 91, a video image of the competitor in a replay is not projected, but information 77 indicating a history is projected. In the example indicated by the sign 92, the information 77 indicating a history and a replay video image 78 are projected. In the example indicated by the sign 93, a plurality of replay video images, namely a replay video image 78 and a replay video image 79, are projected at the same time. These replay video images may be images of the same competitor or different competitors.

Otherwise, the system 1 may project content including the numerical values, text, and the like described in the first provision process or project a visualization of the numerical values or text as the replay information. In addition, when projecting a replay video image, the system 1 may also improve the visibility of the holds 31 by means, such as by projecting an image of a predetermined color overlaid onto the holds 31. The system 1 may project a combined plurality of the replay information described above, or project the replay information singly. Also, when projecting the replay information, the system 1 may change the projection content and staging for every competitor 10. For example, the system 1 projects a past replay video image of a route according to the height and proficiency of the competitor 10.

Besides a video image, the system 1 may also output additional information such as biological information about the competitor 10 and sound information of the audience 20 included in the replay information. Additionally, on the basis of the additional information, the system 1 may output a replay video image after performing automatic editing such as highlight scenes and slow motion, for example.

4. Modifications

Figure 15:
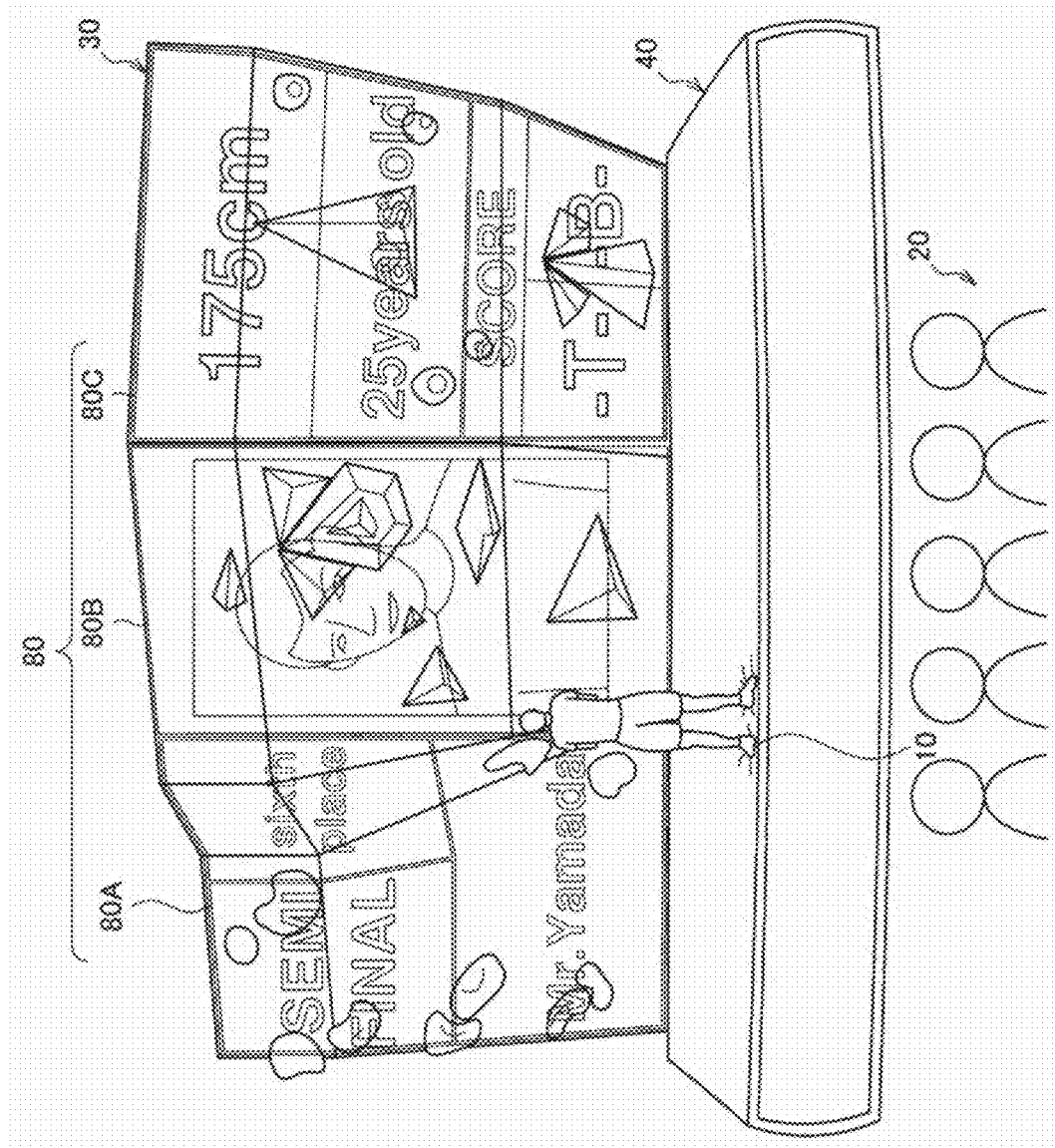
FIG. 15 is a diagram for explaining one example of content provided in a provision process according to a modification of the embodiment.
Figure 16:
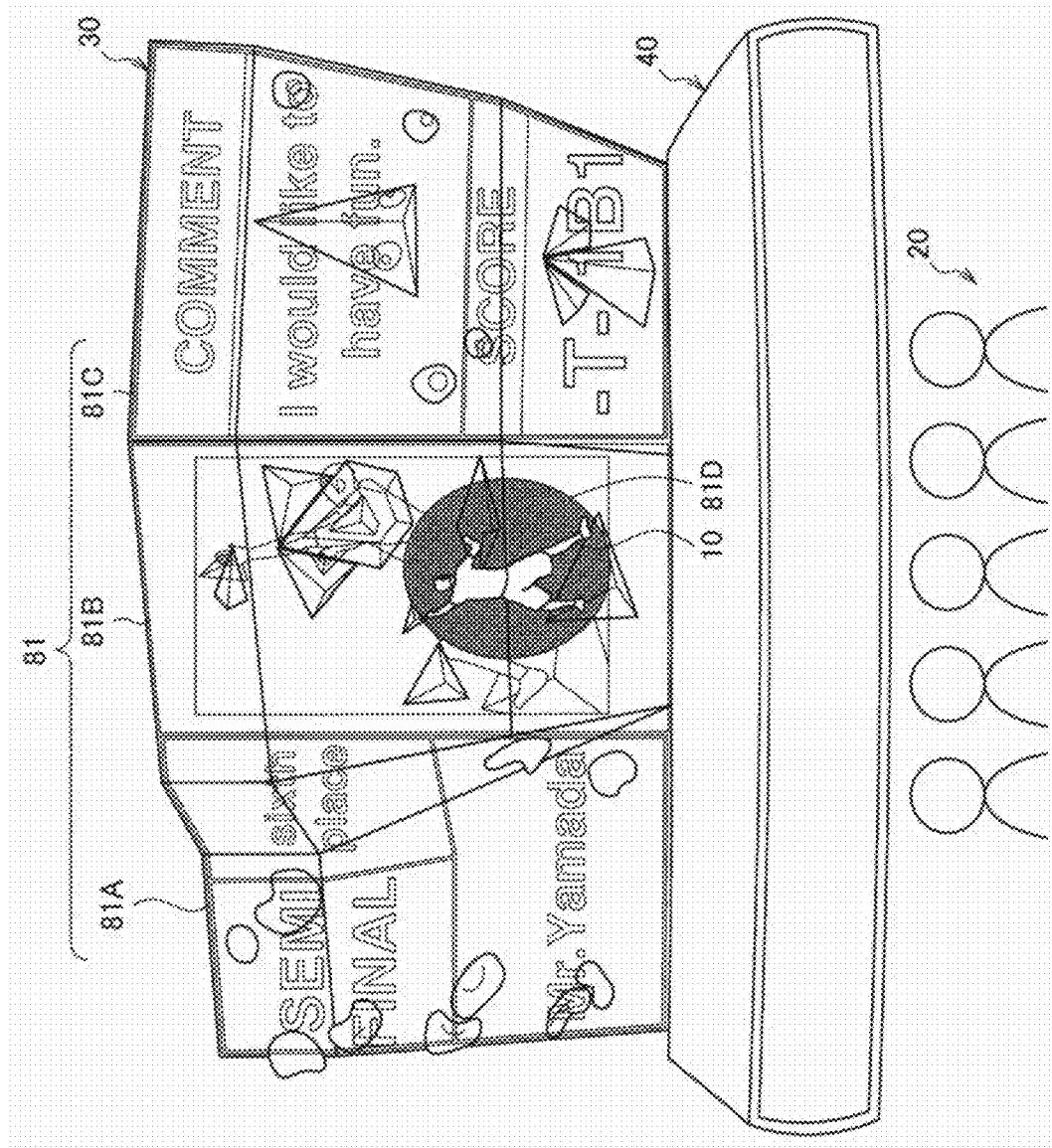
FIG. 16 is a diagram for explaining one example of content provided in a provision process according to a modification of the embodiment.
Figure 17:
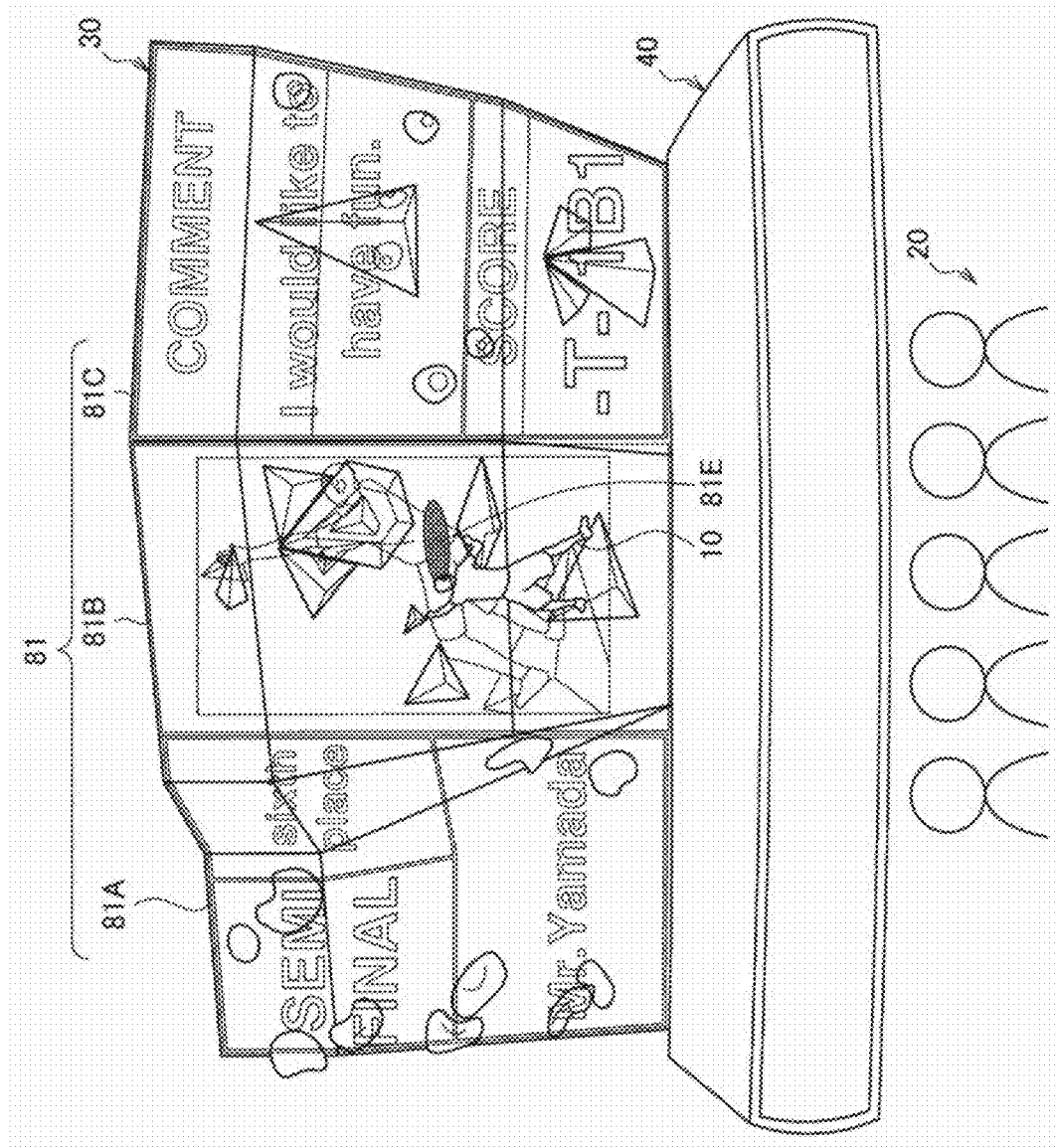
FIG. 17 is a diagram for explaining one example of content provided in a provision process according to a modification of the embodiment.

The foregoing describes an example in which the projection region varies dynamically on the basis of the state of the competitor 10 (such as the position, attitude, and line of sight, for example), but the present technology is not limited to such an example. For example, the projection content may also be controlled dynamically according to the state of the competitor 10 after the projection region is set statically. This point will be described with reference to FIGS. 15 to 17. FIGS. 15 to 17 illustrate an example at a climbing tournament. Note that in FIGS. 15 to 17, projection onto the back of the competitor 10 is omitted from illustration to avoid confusion.

FIG. 15 is a diagram for explaining one example of content provided in a provision process according to a modification of the embodiment. FIG. 15 illustrates a situation before competition starts, and content 80 is being projected by treating the entire face of the climbing wall 30 as the projection region. The content 80 includes content 80A, 80B, and 80C. The content 80A indicates that the competition is a semi-final, and includes the rank of the competitor 10 and the name of the competitor 10. The content 80B includes a face image of the competitor 10. The content 80C includes the height and age of the competitor 10, as well as the score in the competition (an initial value because the competition has not started yet).

The projection region of the content 80 is stationary. For the output device 200, a stationary projector may be used. The content 80 may also be projected by being divided up and handled by a plurality of projectors.

FIG. 16 is a diagram for explaining one example of content provided in the provision process according to a modification of the embodiment. FIG. 16 illustrates a situation during the competition, and content 81 is being projected by treating the entire face of the climbing wall 30 as the projection region. The content 81 includes content 81A, 81B, and 81C. The content 81A includes the same content as the content 80A. The content 81B includes a video image of the competitor 10 in mid-competition. The content 81C includes text information indicating a comment about the tournament by the competitor 10 and the score in the competition.

The projection region of the content 81 is stationary. However, the output control unit 137 controls the projection content on the basis of the environment information, the sensing information, and the detection information. Specifically, the output control unit 137 partially hides (for example, projects solid black or solid white) a region that may satisfy the criterion of visibility for the competitor 10 from among the projection region. In the example illustrated in FIG. 16, a region including the whole body of the competitor 10 from among the content 81 is defined as a hidden region 81D, and solid black is projected in this region.

According to the example illustrated in FIG. 16, since the content is displayed statically, the audience 20 is able to view the content easily. Also, according to the example illustrated in FIG. 16, since a hidden region is defined around the competitor 10 and solid black is projected, it is possible to reduce the influence of the projection of content on the competition.

FIG. 17 is a diagram for explaining one example of content provided in a provision process according to a modification of the embodiment. Similarly to FIG. 16, FIG. 17 illustrates a situation during the competition, and content 81 is being projected by treating the entire face of the climbing wall 30 as the projection region. However, the output control unit 137 partially hides (for example, projects solid black or solid white) a region that currently satisfies the criterion of visibility for the competitor 10 from among the projection region. In the example illustrated in FIG. 17, a region in the line-of-sight direction of the competitor 10 from among the content 81 is defined as a hidden region 81E, and solid black is projected in this region.

According to the example illustrated in FIG. 17, since the content is displayed statically, the audience 20 is able to view the content easily. Also, according to the example illustrated in FIG. 17, since a hidden region is defined in at least the region currently satisfying the criterion of visibility for the competitor 10, it is possible to reduce the influence of the projection of content on the competition. Furthermore, according to the example illustrated in FIG. 17, since the range of the hidden region is narrow compared to the example illustrated in FIG. 16, the visibility of content for the audience 20 can be improved.

Note that although the above describes the hidden region being defined, instead of the region being hidden, the region may be replaced with the first content. Since the first content has little or no influence on the competition even if the first content enters the field of view of the competitor 10, it is possible to reduce the influence of the projection of content on the competition.

5. Supplement

The system 1 may also be adopted as a system independent from the management system of the sports event. With this arrangement, the system 1 becomes capable of achieving new staging while also guaranteeing the neutrality and fairness of the competition.

The specific method of guaranteeing independence may be, for example, separating a timer used by the system 1 from an official timer of the management system of the sports event. With this arrangement, it is possible to prevent incorrect operation of the timer used by the system 1 from influencing the competition. Specifically, the system 1 is capable of guaranteeing independence by controlling the information transmission direction with software or by capturing an image of the official timer and performing text recognition on the image capture result.

Also, at a typical sports event, scores are handwritten on paper and used. Accordingly, the system 1 acquires score data by performing text recognition on the handwritten score. With this arrangement, it becomes possible to adopt the system while guaranteeing independence and also reduce related operating costs, and thereby reduce barriers to adoption.

6. Example of Hardware Configuration

Figure 18:
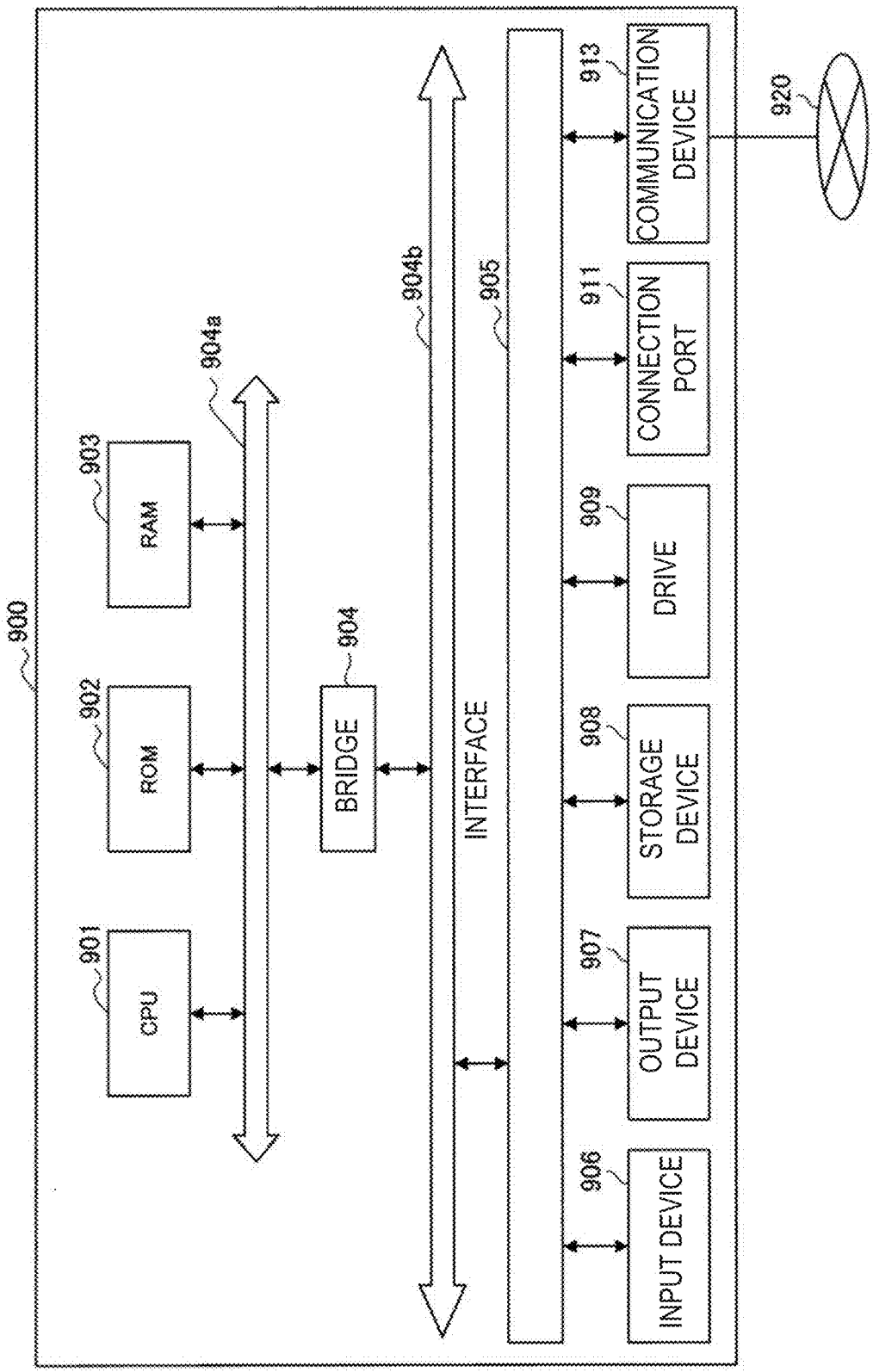
FIG. 18 is a block diagram illustrating an example of a hardware configuration of the information processing apparatus according to the embodiment.

Finally, a hardware configuration of an information processing apparatus according to the embodiments will be described with reference to FIG. 18. FIG. 18 is a block diagram illustrating an example of the hardware configuration of the information processing apparatus according to the embodiment. Note that an information processing apparatus 900 illustrated in FIG. 18 can realize the system 1 described above with reference to FIG. 2, for example. Information processing performed by the system 1 according to the embodiments is realized by cooperation between software and hardware, which will be described later.

As illustrated in FIG. 18, the information processing apparatus 900 includes a central processing unit (CPU) 901, a read only memory (ROM) 902, a random access memory (RAM) 903 and a host bus 904a. In addition, the information processing apparatus 900 includes a bridge 904, an external bus 904b, an interface 905, an input device 906, an output device 907, a storage device 908, a drive 909, a connection port 911 and a communication device 913. The information processing apparatus 900 may include a processing circuit such as an electric circuit, a DSP or an ASIC instead of the CPU 901 or along therewith. The interface 905 can form the I/F unit 110 illustrated in FIG. 2, for example.

The CPU 901 functions as an arithmetic processing device and a control device and controls the overall operation in the information processing apparatus 900 according to various programs. Further, the CPU 901 may be a microprocessor. The ROM 902 stores programs, operation parameters and the like used by the CPU 901. The RAM 903 temporarily stores programs used in execution of the CPU 901, parameters appropriately changed in the execution, and the like. The CPU 901 can form the control unit 130 illustrated in FIG. 2, for example.

The CPU 901, the ROM 902 and the RAM 903 are connected by the host bus 904a including a CPU bus and the like. The host bus 904a is connected with the external bus 904b such as a peripheral component interconnect/interface (PCI) bus via the bridge 904. Further, the host bus 904a, the bridge 904 and the external bus 904b are not necessarily separately configured and such functions may be mounted in one bus.

The input device 906 is realized by a device through which a user inputs information, such as a mouse, a keyboard, a touch panel, a button, a microphone, a switch, and a lever, for example. In addition, the input device 906 may be a remote control device using infrared ray or other electric waves or external connection equipment such as a cellular phone or a PDA corresponding to operation of the information processing apparatus 900, for example. Furthermore, the input device 906 may include an input control circuit or the like which generates an input signal on the basis of information input by the user using the aforementioned input means and outputs the input signal to the CPU 901, for example. The user of the information processing apparatus 900 may input various types of data or order a processing operation for the information processing apparatus 900 by operating the input device 906.

In addition to the above, the input device 906 can be formed by a device that detects information related to the user. For example, the input device 906 can include various sensors such as an image sensor (a camera, for example), a depth sensor (a stereo camera, for example), an acceleration sensor, a gyro sensor, a geomagnetic sensor, an optical sensor, a sound sensor, a distance measurement sensor, and a force sensor. Also, the input device 906 may acquire information related to the state of the information processing apparatus 900 itself such as the posture and the moving velocity of the information processing apparatus 900 and information related to a surrounding environment of the information processing apparatus 900 such as brightness or noise around the information processing apparatus 900. Also, the input device 906 may include a GNSS module that receives a GNSS signal (a GPS signal from a global positioning system (GPS) satellite, for example) from a global navigation satellite system (GNSS) satellite and measures position information including the latitude, the longitude, and the altitude of the device. In addition, the input device 906 may detect the position through Wi-Fi (registered trademark), transmission and reception to and from a mobile phone, a PHS, a smartphone, or the like, near-field communication, or the like, in relation to the position information. The input device 906 may form the sensor device 300 illustrated in FIG. 2, for example.

The output device 907 is formed by a device that may visually or aurally notify the user of acquired information. As such devices, there are a display device such as a CRT display device, a liquid crystal display device, a plasma display device, an EL display device, a laser projector, an LED projector or a lamp, a sound output device such as a speaker and a headphone, a printer device and the like. The output device 907 outputs results acquired through various processes performed by the information processing apparatus 900, for example. Specifically, the display device visually displays results acquired through various processes performed by the information processing apparatus 900 in various forms such as text, images, tables and graphs. On the other hand, the sound output device converts audio signals including reproduced sound data, audio data and the like into analog signals and aurally outputs the analog signals. The output device 907 may form the output device 200 illustrated in FIG. 2, for example.

The storage device 908 is a device for data storage, formed as an example of a storage unit of the information processing apparatus 900. For example, the storage device 908 is realized by a magnetic storage device such as an HDD, a semiconductor storage device, an optical storage device, a magneto-optical storage device or the like. The storage device 908 may include a storage medium, a recording device for recording data on the storage medium, a reading device for reading data from the storage medium, a deletion device for deleting data recorded on the storage medium and the like. The storage device 908 stores programs and various types of data executed by the CPU 901, various types of data acquired from the outside and the like.

The storage device 908 may form the storage unit 120 illustrated in FIG. 2, for example.

The drive 909 is a reader/writer for storage media and is included in or externally attached to the information processing apparatus 900. The drive 909 reads information recorded on a removable storage medium such as a magnetic disc, an optical disc, a magneto-optical disc or a semiconductor memory mounted thereon and outputs the information to the RAM 903. In addition, the drive 909 can write information on the removable storage medium.

The connection port 911 is an interface connected with external equipment and is a connector to the external equipment through which data may be transmitted through a universal serial bus (USB) and the like, for example.

The communication device 913 is a communication interface formed by a communication device for connection to a network 920 or the like, for example. The communication device 913 is a communication card or the like for a wired or wireless local area network (LAN), long term evolution (LTE), Bluetooth (registered trademark) or wireless USB (WUSB), for example. In addition, the communication device 913 may be a router for optical communication, a router for asymmetric digital subscriber line (ADSL), various communication modems or the like. For example, the communication device 913 may transmit/receive signals and the like to/from the Internet and other communication apparatuses according to a predetermined protocol, for example, TCP/IP or the like.

Further, the network 920 is a wired or wireless transmission path of information transmitted from devices connected to the network 920. For example, the network 920 may include a public circuit network such as the Internet, a telephone circuit network or a satellite communication network, various local area networks (LANs) including Ethernet (registered trademark), a wide area network (WAN) and the like. In addition, the network 920 may include a dedicated circuit network such as an internet protocol-virtual private network (IP-VPN).

Hereinbefore, an example of a hardware configuration capable of realizing the functions of the information processing apparatus 900 according to this embodiment is shown. The respective components may be implemented using universal members, or may be implemented by hardware specific to the functions of the respective components. Accordingly, according to a technical level at the time when the embodiments are executed, it is possible to appropriately change hardware configurations to be used.

In addition, a computer program for realizing each of the functions of the information processing apparatus 900 according to the present embodiment as described above may be created, and may be mounted in a PC or the like. Furthermore, a computer-readable recording medium on which such a computer program is stored may be provided. The recording medium is a magnetic disc, an optical disc, a magneto-optical disc, a flash memory, or the like, for example. Further, the computer program may be delivered through a network, for example, without using the recording medium.

7. Conclusion

The foregoing refers to FIGS. 1 to 18 to describe one embodiment of the present disclosure in detail. As described above, the system 1 according to the embodiment outputs content related to a performer, on the basis of detection information detected regarding an audience or the performer who performs an action to be viewed by the audience, in a display region that satisfies the criterion of visibility for the audience and the criterion of ease-of-viewability of the action of the performer by the audience, and does not satisfy the criterion of visibility for the performer. With this arrangement, because the content is output in a location that is easy to see for the audience viewing the action of the performer, the audience becomes able to view the action of the performer and the content easily, and convenience is improved for the audience. Furthermore, since the content is output in the display region that does not satisfy the criterion of visibility for the performer, it is possible to prevent the output of the content from exerting a psychological or physical influence on the performer.

The preferred embodiment(s) of the present disclosure has/have been described above with reference to the accompanying drawings, whilst the present disclosure is not limited to the above examples. A person skilled in the art may find various alterations and modifications within the scope of the technical idea described in the appended claims, and it should be understood that they will naturally come under the technical scope of the present disclosure.

For example, each device described in this specification may be realized as a standalone device, or part or all of each device described in this specification may be realized as separate devices. For example, the information processing apparatus 100, the output device 200, and the sensor device 300 illustrated in FIG. 2 may be realized as a standalone device. As another example, the information processing apparatus 100 illustrated in FIG. 2 may also be realized as a server device connected to the output device 200 and the sensor device 300 over a network or the like.

Further, the processes described using the flowcharts in this specification need not be necessarily executed in the described order. Several process steps may be executed in parallel. Further, an additional process step may be employed, and some process steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present disclosure may also be configured as below.

(1)

An information processing apparatus including:

a control unit that outputs content related to a performer, on the basis of detection information detected regarding an audience or the performer who performs an action to be viewed by the audience, in a display region that satisfies a criterion of visibility for the audience and a criterion of ease-of-viewability of an action of the performer by the audience, and does not satisfy a criterion of visibility for the performer.

(2)

The information processing apparatus according to (1), in which the control unit switches the content to output in the display region between first content that does not include information related to an ongoing action by the performer and second content that includes information related to an ongoing action by the performer.

(3)

The information processing apparatus according to (2), in which in a case in which the display region changes to one that satisfies the criterion of visibility for the performer, the control unit switches the content to output to the first content.

(4)

The information processing apparatus according to any one of (1) to (3), in which the control unit switches the display region on the basis of the detection information.

(5)

The information processing apparatus according to any one of (1) to (4), in which the control unit outputs a recorded video image of the performer in a same space as a space where the performer performed the action and aligned with a position of the performer during recording.

(6)

The information processing apparatus according to any one of (1) to (4), in which the control unit outputs a recorded video image of the performer in a space different from a space where the performer performed the action.

(7)

The information processing apparatus according to any one of (1) to (6), in which the control unit outputs a recorded video image of a first performer in a space where a second performer performs an action.

(8)

The information processing apparatus according to any one of (1) to (7), in which the control unit outputs a recorded video image of the performer in association with biological information about the performer.

(9)

The information processing apparatus according to any one of (1) to (8), in which the detection information includes information detected regarding a position, an attitude, and a line of sight of the audience or the performer.

(10)

The information processing apparatus according to any one of (1) to (9), in which the detection information includes information detected regarding gear used by the performer.

(11)

The information processing apparatus according to any one of (1) to (10), in which the action is climbing, the display region is a partial region of a climbing wall, and the content is projected onto the display region.

(12)

The information processing apparatus according to any one of (1) to (11), in which the control unit outputs content related to the performer in the display region on the basis of the detection information detected regarding the audience and the performer.

(13)

An information processing method including:

outputting, by an output device, content related to a performer, on the basis of detection information detected regarding an audience or the performer who performs an action to be viewed by the audience, in a display region that satisfies a criterion of visibility for the audience and a criterion of ease-of-viewability of the action of the performer by the audience, and does not satisfy a criterion of visibility for the performer.

(14)

A program causing a computer to function as:

a control unit that outputs content related to a performer, on the basis of detection information detected regarding an audience or the performer who performs an action to be viewed by the audience, in a display region that satisfies a criterion of visibility for the audience and a criterion of ease-of-viewability of the action of the performer by the audience, and does not satisfy a criterion of visibility for the performer.

REFERENCE SIGNS LIST

1 System
10 Performer, Competitor
20 Audience
30 Climbing wall
31 Hold
40 Mat
100 Information processing apparatus
110 I/F unit
120 Storage unit
130 Control unit
131 Setting unit
133 Detection unit
135 Recording control unit
137 Output control unit
200 Output device
300 Sensor device

The invention claimed is:

1. An information processing apparatus, comprising:
a processor configured to:
  detect first information indicating a line of sight of at least one of an audience or a performer;
  detect second information related to an action of the performer;
  generate a first content that comprises personal information of the performer;
  generate a second content based on the detected first information and the detected second information;
  detect third information related to a display region for display of at least one of the first content or the second content, wherein the action is viewable by the audience;
  control the display of the at least one of the first content or the second content in the display region based on the detected third information, wherein the display region satisfies one of:
    a first criterion of visibility for the audience and a second criterion of ease-of-viewability of the action of the performer by the audience, or
    a third criterion of visibility for the performer; and
  switch the display between the first content and the second content on the display region, wherein the display is switched from the second content to the first content based on the satisfaction of the third criterion of visibility for the performer.

2. The information processing apparatus according to claim 1, wherein the processor is further configured to switch between the first content and the second content in the display region based on the detected first information and the detected second information.

3. The information processing apparatus according to claim 1, wherein
the processor is further configured to control display of a recorded video image of the performer in a specific space,
the action is performed in the specific space, and
the specific space is aligned with a position of the performer during a recording process.

4. The information processing apparatus according to claim 1, wherein
the processor is further configured to control display of a recorded video image of the performer in a first space,
the action is performed in a second space, and
the first space is different than the second space.

5. The information processing apparatus according to claim 1, wherein
the processor is further configured to control display of a recorded video image of a first performer in a space, and
a second performer performs the action in the space.

6. The information processing apparatus according to claim 1, wherein the processor is further configured to control display of a recorded video image of the performer in association with biological information of the performer.

7. The information processing apparatus according to claim 1, wherein the first information further indicates a position and an attitude of the at least one of the audience or the performer.

8. The information processing apparatus according to claim 1, wherein the processor is further configured to detect fourth information related to a gear used by the performer.

9. The information processing apparatus according to claim 1, wherein
the action is climbing,
the display region is a partial region of a climbing wall, and
the at least one of the first content or the second content is projected onto the display region.

10. The information processing apparatus according to claim 1, wherein the processor is further configured to control the display of the first content of the performer in the display region based on fourth information related to the audience.

11. The information processing apparatus according to claim 1, wherein the processor is further configured to control a position, a size, and a shape of the display region based on the detected first information and the detected third information.

12. The information processing apparatus according to claim 1, wherein the processor is further configured to:
detect environment information indicating a shape of a space where the audience and the performer are present; and
control the display region based on the detected environment information.

13. An information processing method, comprising:
detecting, by a processor, first information indicating a line of sight of at least one of an audience or a performer;
detecting, by the processor, second information related to an action of the performer;
generating, by the processor, a first content that comprises personal information of the performer;
generating, by the processor, a second content based on the detected first information and the detected second information;
detecting, by the processor, third information related to a display region for display of at least one of the first content or the second content, wherein the action is viewable by the audience;
controlling, by the processor, the display of the at least one of the first content or the second content in the display region based on the detected third information, wherein the display region satisfies one of:
  a first criterion of visibility for the audience and a second criterion of ease-of-viewability of the action of the performer by the audience, or
  a third criterion of visibility for the performer; and
switching, by the processor, the display between the first content and the second content on the display region, wherein the display is switched from the second content to the first content based on the satisfaction of the third criterion of visibility for the performer.

14. A non-transitory computer-readable medium having stored thereon computer-executable instructions which, when executed by a computer, cause the computer to execute operations, the operations comprising:
- detecting first information indicating a line of sight of at least one of an audience or a performer;
- detecting second information related to an action of the performer;
- generating a first content that comprises personal information of the performer;
- generating a second content based on the detected first information and the detected second information;
- detecting third information related to a display region for display of at least one of the first content or the second content, wherein the action is viewable by the audience;
- controlling the display of the at least one of the first content or the second content in the display region based on the detected third information, wherein the display region satisfies one of:
  - a first criterion of visibility for the audience and a second criterion of ease-of-viewability of the action of the performer by the audience, or
  - a third criterion of visibility for the performer; and
- switching the display between the first content and the second content on the display region, wherein the display is switched from the second content to the first content based on the satisfaction of the third criterion of visibility for the performer.

* * * * *